US009547887B2

(12) United States Patent
Liang et al.

(10) Patent No.: US 9,547,887 B2
(45) Date of Patent: Jan. 17, 2017

(54) VISUAL-EXPERIENCE-OPTIMIZED SUPER-RESOLUTION FRAME GENERATOR

(71) Applicant: Hong Kong Applied Science & Technology Research Institute Company Limited, Hong Kong (HK)

(72) Inventors: Luhong Liang, Hong Kong (HK); Peng Luo, Shenzhen (CN); King Hung Chiu, Hong Kong (HK); Wai Keung Cheung, Hong Kong (HK)

(73) Assignee: Hong Kong Applied Science and Technology Research Institute Company, Limited, Hong Kong (HK)

( * ) Notice: Subject to any disclaimer, the term of this patent is extended or adjusted under 35 U.S.C. 154(b) by 235 days.

(21) Appl. No.: 14/163,076

(22) Filed: Jan. 24, 2014

(65) Prior Publication Data

US 2015/0093015 A1    Apr. 2, 2015

(51) Int. Cl.
*G06T 3/40*   (2006.01)
*G06K 9/62*   (2006.01)

(52) U.S. Cl.
CPC ........... *G06T 3/4076* (2013.01); *G06K 9/6267* (2013.01)

(58) Field of Classification Search
CPC ............................. G06K 9/6267; G06T 3/4076
USPC   382/125, 299, 275, 162, 199, 154; 348/441, 348/248; 375/240.16
See application file for complete search history.

(56) References Cited

U.S. PATENT DOCUMENTS

| | | | |
|---|---|---|---|
| 8,036,488 B2 * | 10/2011 | Nagumo | G06T 3/4076 375/240.16 |
| 8,036,494 B2 | 10/2011 | Chen | |
| 8,346,012 B2 * | 1/2013 | Nagumo | G06T 3/4076 382/275 |
| 8,374,464 B2 | 2/2013 | Toda | |
| 8,675,999 B1 | 3/2014 | Liang et al. | |
| 2008/0175519 A1 * | 7/2008 | Nagumo | G06T 3/4076 382/299 |
| 2010/0079630 A1 | 4/2010 | Mishima et al. | |

(Continued)

OTHER PUBLICATIONS

Nabil G. Sadaka and Lina J. Karam, "Perceptual attentive SR", VPQM2009.

(Continued)

*Primary Examiner* — Mekonen Bekele
(74) *Attorney, Agent, or Firm* — Stuart T. Auvinen; gPatent LLC

(57) ABSTRACT

An image processor generates a Super-Resolution (SR) frame by upscaling. A Human Visual Preference Model (HVPM) helps detect random texture regions, where visual artifacts and errors are tolerated to allow for more image details, and immaculate regions having flat areas, corners, or regular structures, where details may be sacrificed to prevent annoying visual artifacts that seem to stand out more. A regularity or isotropic measurement is generated for each input pixel. More regular and less anisotropic regions are mapped as immaculate regions. Higher weights for blurring, smoothing, or blending from a single frame source are assigned for immaculate regions to reduce the likelihood of generated artifacts. In the random texture regions, multiple frames are used as sources for blending, and sharpening is increased to enhance details, but more artifacts are likely. These artifacts are more easily tolerated by humans in the random texture regions than in the regular-structure immaculate regions.

20 Claims, 16 Drawing Sheets

(56) References Cited

U.S. PATENT DOCUMENTS

| | | |
|---|---|---|
| 2010/0135395 A1 | 6/2010 | Servais et al. |
| 2012/0019725 A1* | 1/2012 | Nagumo ............... G06T 3/4076 348/584 |
| 2012/0086850 A1* | 4/2012 | Irani .................... G06T 3/4053 348/441 |
| 2012/0219229 A1 | 8/2012 | Springer et al. |
| 2013/0034299 A1 | 2/2013 | Lin et al. |
| 2013/0034311 A1 | 2/2013 | Lin et al. |
| 2013/0034313 A1* | 2/2013 | Lin ....................... G06T 3/4053 382/299 |

OTHER PUBLICATIONS

Nabil G. Sadaka and Lina J. Karam, "Efficient perceptual attentive SR", ICIP2009.
Qi Shan, Zhaorong Li, Jiaya Jia and Chi-Keung Tang, "Fast Image/Video Upscampling", ACM Trans. Graph. 27, 5, Article 153 (Dec. 2008).
Chin-Teng Lin, Kang-Wei Fan, Her-Chang Pu, Shih-Mao Lu, and Sheng-Fu Liang, "An HVS-Directed Neural-Network-Based Image Resolution Enhancement Scheme for Image Resizing", IEEE Transactions on Fuzzy Systems, vol. 15, No. 4, Aug. 2007.
Jinjian Wu, Fei Qi and Guangming Shi, "Self-similarity based structural regularity for just noticeable difference estimation", J. Vos. Commun. Image R. 23 (2012) 845-852.

* cited by examiner

VISUAL-EXPERIENCE-OPTIMIZED SUPER-RESOLUTION FRAME GENERATOR

RELATED APPLICATION

This application claims the benefit of China Application No. 201310447132.4 filed Sep. 27, 2013.

FIELD OF THE INVENTION

This invention relates generally to image and video processing, and more particularly to converting lower-resolution images to super-resolution using visual-experience-optimized methods.

BACKGROUND OF THE INVENTION

Super-resolution (SR) methods aim to generate new high-resolution (HR) information beyond the Nyquist frequency of an existing low-resolution (LR) image. SR methods are attracting great practical interest, especially for HDTV, UHDTV (4KTV and 8KTV), video communication, video surveillance, medical imaging, etc. For example, a HDTV image of 1080 lines and 1920 pixels per line may be converted to a UHDTV image of 2160 lines and 3840 pixels per line by expanding each HDTV pixel to four UHDTV pixels.

Super-resolution technologies can be classified into the classical multi-frame SR and single-frame SR. The multi-frame SR method recovers high frequency information from multiple frames of a video or a set of images with sub-pixel misalignment. Most of the approaches involve motion estimation method to recover these misalignments. Various blending and regularization methods such as IBP (iterative back-projection) and MAP (maximum a-posterior) have been used to make the reconstructed HR image consistent with the input LR image. Weights may be calculated using various cues such as a degree of similarity in patch matching, motion vector continuities, and the length of motion vectors for blending and regularization.

Since multi-frame SR methods need to capture, buffer, and manipulate multiple images or frames, the memory consumption and computational complexity are rather high. Moreover, although such SR schemes provide reasonably stable results up to a magnification factor of about 2, they are limited in the presence of noise and misregistration. These limitations and the undesirability of any resulting visual artifacts have led to the development of single-frame SR methods, which are also named example-based SR, learning-based SR, or "hallucination".

Typical example-based SR methods recover high-resolution (HR) information using one single-input low-resolution (LR) image. Two major modules are used, HR information recovery, and restoration. In the first module, the input LR image is first divided into many small LR patches that may overlap. For each LR patch, the first module searches its corresponding high-resolution examples in a pre-trained database of any other LR images and/or downsampled/upsampled LR images. Then, the resulting HR patches are used to reconstruct an enlarged image, typically using a blending and weighting process. There is also an approach of selecting patches instead of searching to reduce the computational complexity. In the second module, post-processing such as Iterative Back-Projection (IBP) is used to keep the consistency between the reconstructed HR image and the input LR image, using some assumptions such as an image formation model. There are also some other single-frame SR approaches using other technologies, such as a FFT-based iterative deblur method.

Some approaches use techniques from both the "classic SR" (i.e. multi-frame SR) and example-based SR (i.e. single-frame SR). For example, patch examples may be searched from both a downsampled input LR image and the LR image itself. A hybrid SR approach may extending the search in the current LR image to multiple frames in a video.

Super-resolution has many possible solutions. Many of the existing SR approaches employ optimization methods such as MAP (Maximum a-Posterior), ML (Maximum Likelihood) and IBP (Iterative Back-Projection) to regularize the reconstruction image to be consistent with the input LR image while balancing the sharpness and the artifacts. These approaches are based on certain objective criteria such as Mean Square Error (MSE).

A Human Visual System (HVS) model attempts to model a human's visual preferences, which may be somewhat subjective. HVS has different preferences and sensitivity to image details and artifacts in different local regions. For example, noise and artifacts in the random texture region are less visible for HVS than those in a regular structure region. Humans may immediate notice an artifact or error which seems out of place in an otherwise regular structure, such as a checkerboard, but the same artifact in a random region may not be very noticeable. Thus the same size artifact may be quite irritating to the user when located in a regular structure, but may be invisible when in a random region of the picture.

The HVS model mimics this human preference by permitting more detail information (and a greater chance of artifacts or errors) in a random-texture region than in regular structure regions. Prior art SR methods that ignore the HVM may not create an optimal high-resolution image in terms of a viewer's visual experience.

The HVS model is used to predict the perceptual characteristics of people and has been intensively researched for decades. The HVS models such perceptions as visual attention, foveation, color perception, stereo perception and Just Noticeable Distortion (JND) which has solid support from biological and psychological experiments. Among these models, the JND model is widely used in image processing. The JND model outputs a threshold that represents the limitations of a person's HVS in perceiving small changes in an image. If the noise, artifacts or detail changes in an image are smaller than the JND threshold, they cannot be perceived by the visual system of human being. In practice, these image distortions can be ignored in image processing.

The JND model is usually formulated based on the luminance adaptation, contrast masking, and color masking characteristics of the HVS in a spatial or transformed domain. In the most recent research, the impacts of different textures and temporal variations are also considered.

Some approaches use the JND model to reduce the computational complexity or to select different processing methods used in image upscaling and SR. A JND model that considers luminance adaption and contrast masking may be used to terminate MAP iterations, so that the computation of the SR can be reduced. While useful, prior art approaches considered only a part of HVS characteristics in optimizing the SR reconstruction.

What is desired is an image converter that can generate Super-Resolution images. An image converter can upscale images to a higher resolution is desired. Super-Resolution images that better fit a human's visual experience is desirable. In particular, using both single-frame and multi-frame information is desirable. It is desired to suppress artifacts in regular structures while allowing artifacts and more detail in random structures within a picture. It is desired to identify immaculate regions that are generated to have less detail and fewer resulting artifacts, and detail-preferred regions that are allowed to have artifacts in the SR image.

DETAILED DESCRIPTION OF THE INVENTION

Figure 1:
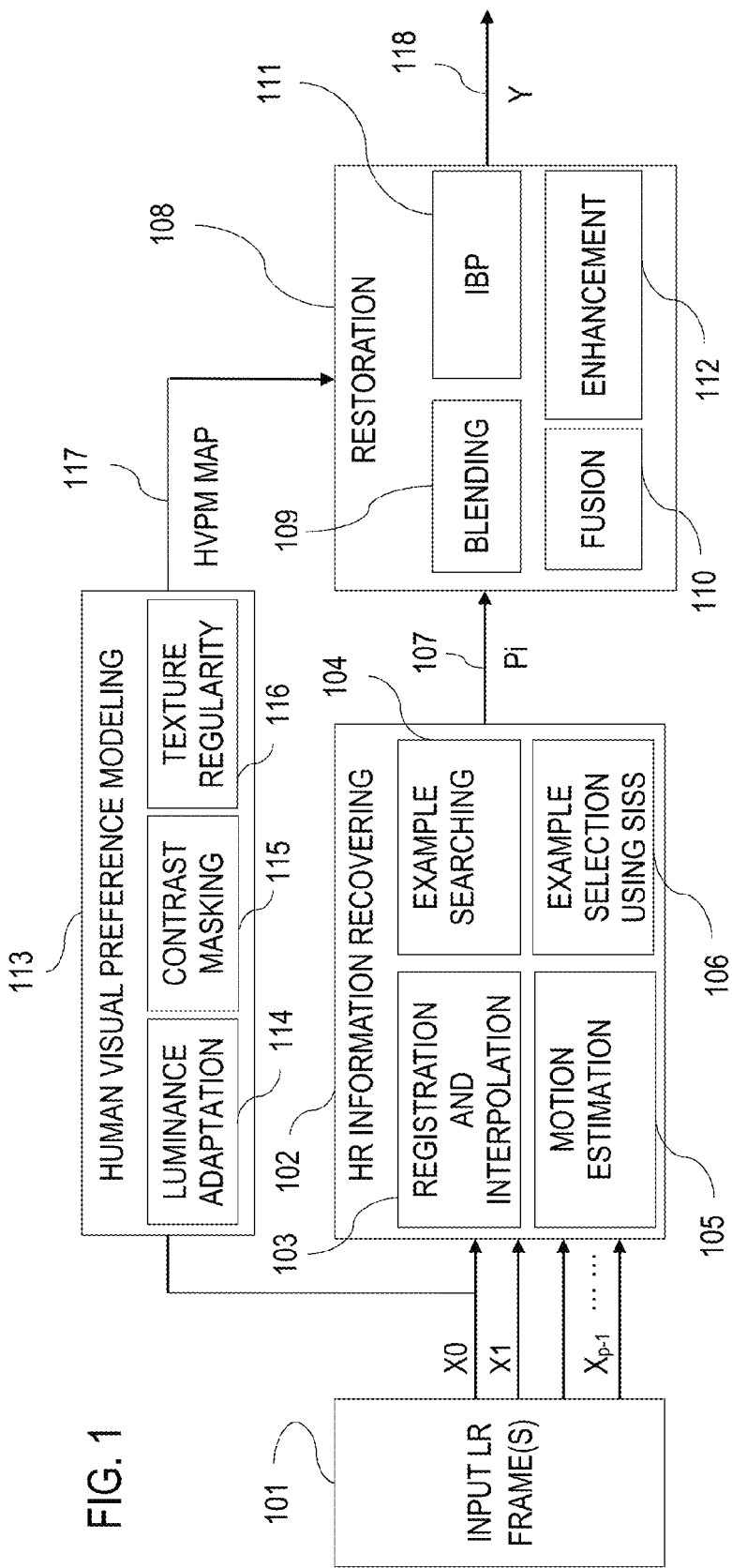
FIG. 1 illustrates one embodiment of a method for Visual Experience Optimized Super Resolution SR (VEO-SR) image generation.

The present invention relates to an improvement in image processing. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that errors are sometimes introduced when generating a SR image from a lower-resolution image. These errors usually appear as artifacts mixed with real image details. These errors sometimes are visible, even annoying, to a human viewing the SR image. SR methods usually optimize the SR image according to an objective criterion such as Mean Square Error (MSE). As a result, certain methods are likely to produce more image details but inevitably more errors and artifacts, and certain other methods are likely to produce fewer errors and artifacts but less image details.

The inventors further realize that such errors or artifacts are more noticeable to a human when they appear within a regular structure, such as an array of parallel lines. The inventors identify these regions having regular structures, and then apply a method that is less likely to create errors or artifacts. These regions are called noise-sensitive or immaculate regions, since they should be free of artifacts, even if sharpness or detail is reduced.

The inventors further realize that errors and artifacts are less noticeable to a human viewer when these artifacts appear in a region showing a random structure or texture. The randomness of the region helps to hide any artifacts caused by a more aggressive image processing method, such as a method that uses multiple frames for input. These regions are called noise-insensitive regions, detailed regions, or random-texture regions, and more aggressive methods of sharpening or other image processing are used in these regions to enhance the details of the image in these regions.

The traditional JND model is enhanced to account for these two kinds of regions. The regularity of each region is evaluated to predict which regions are immaculate regions, and which are detailed regions. The inventors add structure-texture analysis to the JND model. The structure-texture analysis may include several detection methods, such as tensor-based isotropic, corner detection, and flat region detection. Results from various methods may be blended together or fused with various weights, with higher weights assigned to aggressive methods within detailed random-structure regions and lower weights assigned to aggressive methods within regular-structure regions in order to precisely mimic the HVS's preference and to suppress the inevitable errors when using these methods.

Regions having a higher degree of regularity (low randomness) are processed as immaculate regions, where few artifacts are created. Regions having a low degree of regularity (high randomness) are processed as detailed regions that may receive more aggressive processing, such as by using multi-frame inputs, or adopting parameters in single- or multi-frame SR that generate more image details but also more errors or artifacts, since artifacts are tolerated in these regions.

The inventors also have enhanced Iterative Back Projection (IBP) using the JND model with the texture-structure detection. The sensitivity of the IBP projection filter is modified based on the map of immaculate and detailed-texture regions from the JND model with the texture-structure detection. The inventors have also enhanced the patch blending in the single-frame SR and/or multi-frame SR using the JND model with the texture-structure detection. The weights of searched/selected patches are modified based on the map of immaculate and detailed-texture regions from the JND model with the texture-structure detection. The inventors have also discovered that a better 3D effect may be produced by blurring background areas while foreground regions are sharpened or enhanced using the JND model with the texture-structure detection.

FIG. 1 illustrates one embodiment of a Visual Experience Optimized Super Resolution (VEO-SR) method that provides super-resolution (SR) reconstruction that is optimized by a human visual preference model. As illustrated, a traditional SR method can be abstracted to two major modules, i.e. High-Resolution (HR) Information Recovering module 102 and Restoration module 108. Input 101 may be one single low resolution (LR) image/video frame $X_0$ for example-based SR or p LR video frames/images $X_0$~$X_{p-1}$ for multi-frame SR. HR Information Recovering module 102 recovers HR information from these input LR image(s) or video frame(s). In some traditional methods, one of the input LR images $X_0$ may be partitioned into a plurality of overlapped query patches of square or various shapes. Then, the HR counterparts of each query patch or downsampled query patch may be recovered by Motion Estimation 105 among previous and/or later input LR frames ($X_0 \sim X_{p-1}$) or Example Searching 104 in downsampled input LR image $X_0$. In some methods, the query patch itself is selected as the HR counterparts of its central region depending on its scale-invariance self-similarity (SiSS) characteristics in SiSS module 106. In other methods, the input LR images ($X_1 \sim X_{p-1}$) may be registered to $X_0$ in order to recover sub-pixel misalignments among them, and then interpolated to a HR grid as the HR counterparts in module 103. As illustrated, the recovered HR counterparts $P_i$ 107 are then processed using one or some of the methods in Restoration module 108 including Blending 109 of the HR counterparts, Fusion 110 of blending results from different HR information recovering methods, applying Iterative Back-Projection (IBP) 111, and other image Enhancement 112 methods. Finally, the Restoration module 108 outputs HR image Y 118.

In contrast to the traditional SR methods, a Human Visual Preference Model (HVPM) is built and used to optimize the restoration module in order to obtain better subjective quality of the resulting HR image. As illustrated in FIG. 1, Human Visual Preference Model (HVPM) module 113 predicts the preference of the Human Visual System (HVS) on image details, or equivalently, its tolerance on image noise/artifacts, by considering the Luminance Adaption 114, Contrast Masking 115, and Texture Regularity 116 characteristics of input image $X_0$ or other input image(s). The HVS's preference may be described by HVPM map 117, where each pixel in the map represents the degree of the distortion that the HVS can perceive. HVPM map 117 can be used to optimize Restoration module 108, i.e. it can be used to adaptively tune the parameters of blending 109, fusion 110, IBP 111, and enhancement 112 to get a better subjective quality of result image Y 118.

Figure 2:
FIG. 2 illustrates some examples of random texture and regular structure regions of an image.

FIG. 2 illustrates an example of the HVS's different sensitivities to noise, artifacts, or distortion in random texture (i.e. irregular texture) and in regular structure regions of an image. For example, in random texture region 201 such as the coral in the image in FIG. 2, the appearance of the rough coral surface makes any noise or artifacts less visible to the HVS. Human viewers prefer high visibility of the coral details in order to perceive the information about the object. Human viewers can tolerate a high visibility of mixed noise and artifacts.

In contrast, in regular structure regions 202, 203, 204 such as the zebra animal in the image in FIG. 2, the appearance of the relatively flat surface of the zebra with some natural details makes any noise or artifacts more visible to the HVS, so that human viewers prefer a low visibility of these annoying noise or artifacts. Human viewers can tolerate the lack of actual object details to a certain degree.

Figure 3:
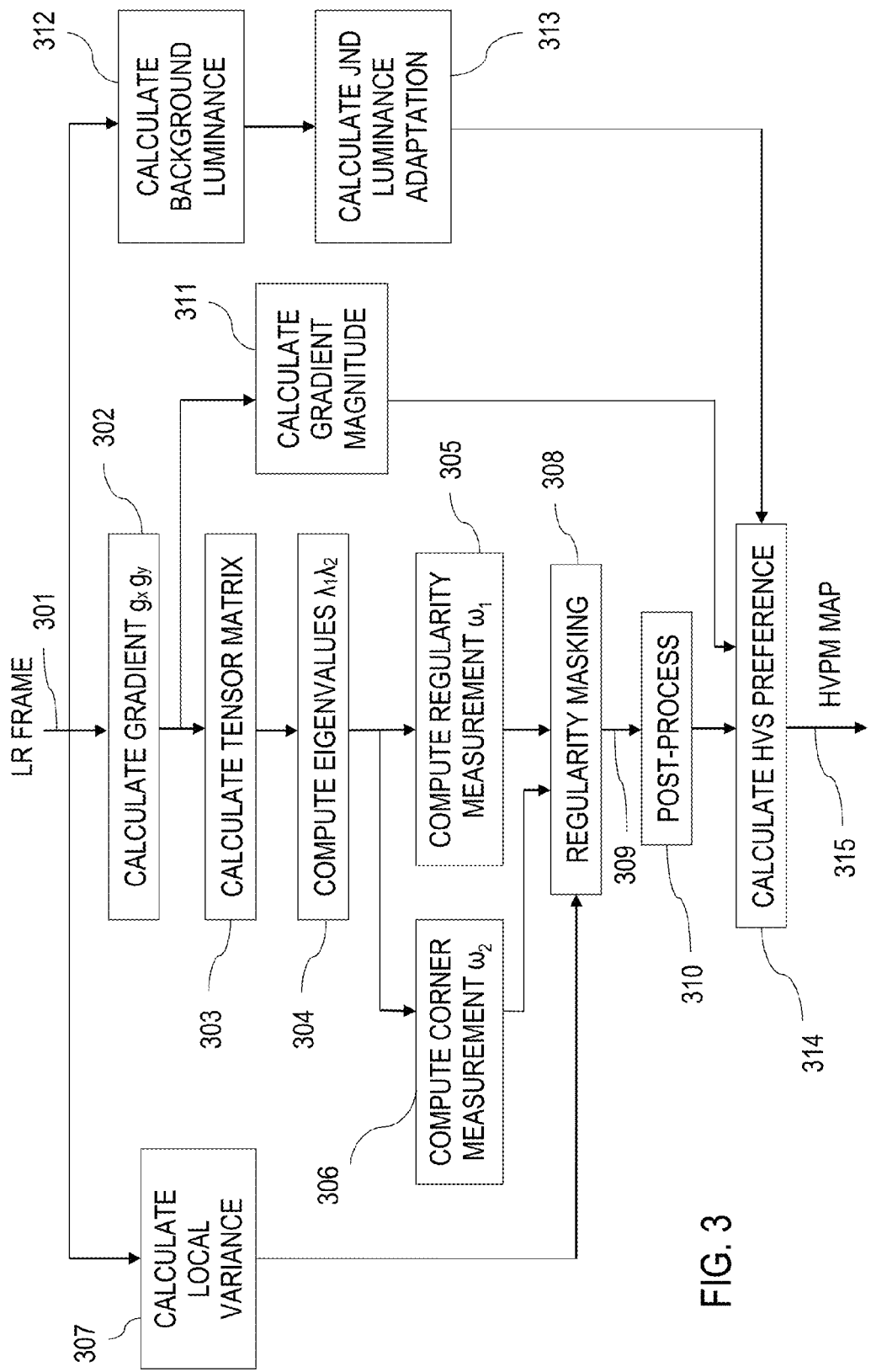
FIG. 3 illustrates one embodiment to build the Human Visual Preference Model (HVPM).

FIG. 3 illustrates one embodiment for building the HVPM. Besides luminance adaptation and contrast masking characteristics, the proposed model considers the influence of the texture regularity. The texture regularity influences the HVS preference of image details. A gradient based structure tensor may be used to measure the regularity characteristic of each pixel in the input LR image. As illustrated in FIG. 3, the embodiment may first calculate the gradient of input LR image 301 in Step 302:

$$g_x = \frac{\partial I(x,y)}{\partial x} \quad (1)$$
$$g_y = \frac{\partial I(x,y)}{\partial y},$$

where $I(x,y)$ is input LR Frame 301 and $g_x(x,y)$ and $g_y(x,y)$ are gradients in X (horizontal) and Y (vertical) directions. In practice the Sobel operator or other gradient calculation filters may be used in gradient calculation. Then, in Step 303 for each pixel the structure tensor matrix of a neighborhood region is calculated as:

$$T(x,y) = \begin{bmatrix} T_{xx} & T_{xy} \\ T_{xy} & T_{yy} \end{bmatrix}, \quad (2)$$

where $T_{xx} = \Sigma_{u,v \in R(x,y)} g_x(u,v)^2$, $T_{yy} = \Sigma_{u,v \in R(x,y)} g_y(u,v)^2$ and $T_{xy} = \Sigma_{u,v \in R(x,y)} g_x(u,v) g_y(u,v)$.
$R(x,y)$ is an image region centered at $(x,y)$. For example, the image region may be a square 5×5 region.

Next, the eigenvalues of the tensor matrix $T(x,y)$ are calculated in Step 304 by solving the equation:

$$(\lambda - T_{xx})(\lambda - T_{yy}) - T_{xy}^2 = 0, \quad (3)$$

where $\lambda$ is the eigenvalue of the matrix. The two solutions of the equation can be calculated by $$\lambda_1 = \frac{T_{xx} + T_{yy} + \sqrt{k}}{2} \quad (4)$$
$$\lambda_2 = \frac{T_{xx} + T_{yy} - \sqrt{k}}{2},$$

where $k = (T_{xx} + T_{yy})^2 - 4(T_{xx} T_{yy} - T_{xy}^2)$.

The eigenvectors summarize the distribution of the gradient within the image region. More specifically, the relative discrepancy between the two eigenvalues is an indicator of the degree of anisotropy of the local content within the image region. This attribute can be quantified in Step 305 by $$\omega_1 = \left(\frac{\lambda_1 - \lambda_2}{\lambda_1 + \lambda_2}\right)^2. \quad (5)$$

This quantity is 1 when the gradient is totally aligned, i.e. anisotropy, and 0 when it has no preferred direction, i.e. isotropy. The formula is undefined, i.e. $\lambda_1 = \lambda_2 = 0$, when the image is constant in the window. In practice, the aligned regions and the constant regions may be considered to be regular structure regions, while other regions are considered to be random texture regions.

However, the tensor metric cannot classify the intersection of edges, e.g. cross and T-junctions, as regular structures, since the gradient distribution of these regions has no preferred direction. To solve this problem, Step 306 also checks the $2^{nd}$ eigenvalue $\lambda_2$ to detect the corners in the image as formulated by:

$$\omega_2 = \alpha \cdot \lambda_2, \quad (6)$$

where $\alpha$ is a parameter to control the sensitivity of the corner detector.

Since there is a lack of gradient information in some flat regions of the image, the local variance is also calculated at Step 307. In this embodiment, the flatness of a region centered by pixel (x,y) is described by Mean Absolute Deviation (MAD) as:

$$MAD(x, y) = \frac{1}{N} \sum_{u,v \in R(x,y)} |I(u, v) - m(x, y)|, \text{ where} \quad (7)$$

$$m(x, y) = \frac{1}{N} \sum_{u,v \in R(x,y)} I(u, v).$$

In the equation, I(u,v) is the intensity of a pixel, N is the pixel number within the region R(x,y). In this embodiment, a 5×5 region is used in calculate the local MAD map.

The regularity measurement is calculated by fusion of the anisotropy measurement, corner measurement, and local variance in Step 308 as:

$$m_{reg} = f_1(\omega_1 + \omega_2) \cdot f_2(MAD). \quad (8)$$

$f_1(\cdot)$ is a piece-wise linear function proportional to its argument. When the anisotropy measurement or the corner measurement is large, its probability of being a regular structure region is high, and vice versa. $f_2(\cdot)$ is a piece-wise linear function inversely proportional to its argument. When the MAD measurement is small, its probability of being a regular structure region is high, and vice versa. When the two items in Equation (8) are combined, the anisotropic, corner, and flat regions will be assigned a high probability of being a regular structure, and vice versa, which is identical to the observations shown in FIG. 2.

Using Equation (8) the regularity measurement for each pixel of the input image can be calculated and placed into regularity measurement map 309. Since the anisotropy, corner, and flatness measurements will have inevitable errors in real-world applications, there may be some incorrect regular measurements that appear as isolated black or white speckles in regularity measurement map 309. Therefore, in Step 310 a post-process is applied to remove those speckles. In most cases, a combination of existing morphology operations such as erosion and dilation can effectively remove these speckles.

The above description only introduces one embodiment of the regularity measurement in images. There may be alternative embodiments using other anisotropy/isotropy measurements or self-similarity measurements to carry out the same purpose.

Besides the regularity of the image, luminance adaptation and contrast masking effects widely used in traditional JND models may be considered. As shown in FIG. 3, Step 311 calculates the gradient magnitude as a measurement of local contrast of each pixel by:

$$MC = \sqrt{g_x^2 + g_y^2}, \quad (9)$$

where $g_x$ and $g_y$ are gradients calculated by Equation (1).

The luminance adaptation can be calculated using background luminance in Step 312. In one embodiment, the background luminance measurement $b_g$ can be calculated as:

$$b_g = I * LP, \quad (10)$$

where I is the input image and LP is a filter. Some embodiments may use an existing 5×5 filter such as:

$$\frac{1}{32}\begin{bmatrix} 1 & 1 & 1 & 1 & 1 \\ 1 & 2 & 2 & 2 & 1 \\ 1 & 2 & 0 & 2 & 1 \\ 1 & 2 & 2 & 2 & 1 \\ 1 & 1 & 1 & 1 & 1 \end{bmatrix}.$$

Then the JND luminance map can be calculated in Step 313 as:

$$JND_l = \begin{cases} T_0\left(1 - \sqrt{\frac{b_g}{127}}\right) + 3 & b_g < 127 \\ \gamma(b_g - 127) + 3 & \text{else} \end{cases} \quad (11)$$

where $T_0$ and $\gamma$ are parameters to adjust the sensitivity to the background luminance.

Finally, the regularity, luminance adaptation, and contrast masking are summed in Step 314. Since these 3 characteristics have cross-effects to each other, in some embodiments these cross-effects are removed in the summation by:

$$m_{HVP} = \tau \cdot (JND_{reg} + JND_{con} + JND_l - \epsilon_0 \cdot \min(JND_{reg}, JND_{con}) - \epsilon_1 \cdot \min(JND_{reg}, JND_l) - \epsilon_2 \cdot \min(JND_{con}, JND_l) + \epsilon_3 \cdot \min(JND_{reg}, JND_{con}, JND_l)). \quad (12)$$

where $JND_{con} = f_3(MC)$, $JND_{reg} = f_4(m_{reg})$ and $\tau$, $\epsilon_0$, $\epsilon_1$ $\epsilon_2$ $\epsilon_3$ are parameters to adjust the overall weight as well as the weights of the cross-effects respectively. Also, $f_3$ is roughly proportional to its argument, while $f_4$ is inversely proportional to its argument. In this specific embodiment, the $m_{HVP}$ measurement is calculated in each pixel of the input image to form a HVPM map. A higher value in the HVPM map indicates that the HVS is insensitive to noise/artifacts and prefers more detail information, and vice versa.

The above description only introduces one embodiment to combine the regularity measurement, the luminance adaptation, and contrast masking to form a HVPM of the combination. There may be alternative embodiments using other anisotropy/isotropy measurements or self-similarity measurements to carry out the same purpose.

Figure 4:
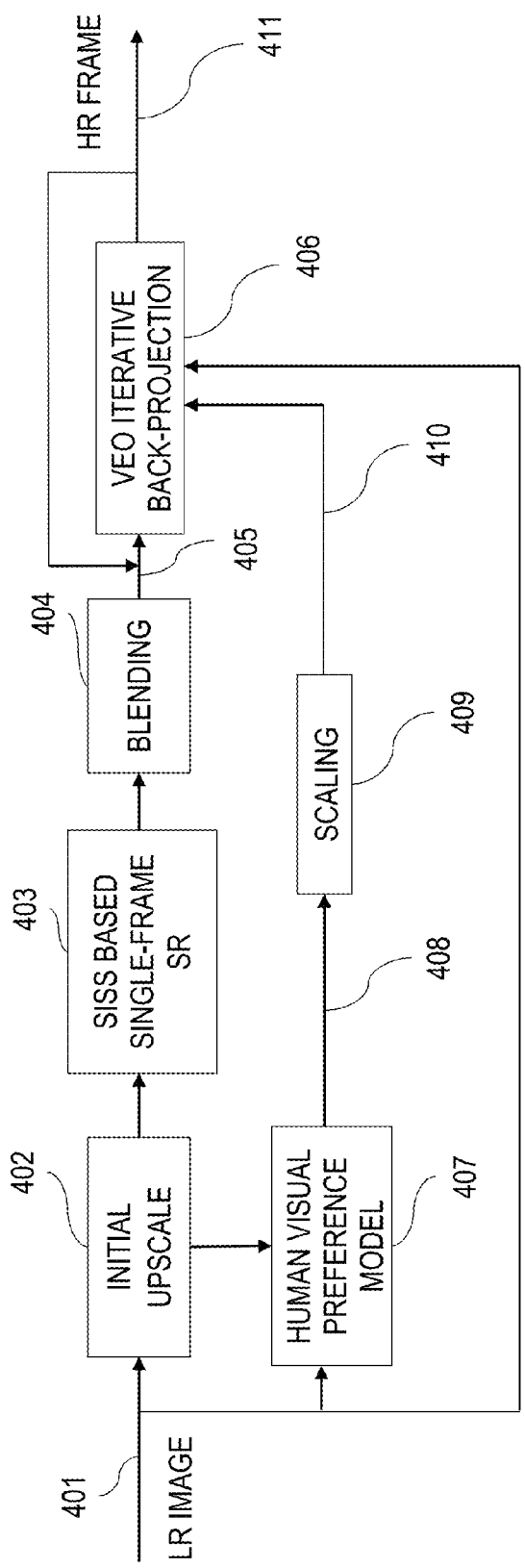
FIG. 4 illustrates an embodiment of example-based SR with Visual Experience Optimized Iterative Back-Projection (VEO-IBP).

FIG. 4 illustrates an embodiment to optimize the Iterative Back-Projection (IBP) stage, VEO-IBP, in an example-based SR framework. In this embodiment, one single LR image or video frame 401 is fed into the SR system to form one video frame or HR image 411. This embodiment follows a general example-based SR method, where the input LR image may be partitioned into a plurality of overlapped query patches for further processing at the beginning. In order to recover information beyond the grid of the LR image, a sliding window moving by sub-pixels may be employed to create these overlapped query patches. In practice, this method can be implemented by an initial upscale step 402 where the image values in the sub-pixel location are interpolated in advance. Then, the Scale-Invariant Self-Similarity (SiSS) based single-frame SR method is applied in step 403 and the selected HR patches are blended in step 404 to form the reconstructed HR image. Next, an iterative back-projection (IBP) process 406 may be applied to keep the consistency between the reconstructed HR image 405, 411 and the input LR image 401.

The Scale-Invariant Self-Similarity (SiSS) based single-frame SR method of step 403 may partition the result image of Initial Upscale step 402 into a plurality of overlapped query patches of multiple shapes and multiple sizes. Additionally, the method of step 403 may include processing the patches in a sequential order. The method of step 403 may compare the whole patch and its central region to obtain the similarity for each patch, i.e. calculating a Scale-Invariant Self-Similarity (SiSS) measurement. The method of step 403 may also include selecting patches with the SiSS measurement larger than a threshold. Each selected patch may be fed into the blending module of step 404 as the HR counterpart of the central region of the same patch.

The Blending module of step 404 blends the HR counterparts into a reconstructed HR image 405. These HR counterparts are patches with multiple sizes and shapes and may have overlap with several neighboring patches. The blending module of step 404 may include calculating the first weight using the SiSS measurement, linearly mapping each pixel of the central region of the patch to corresponding pixels in the patch, calculating the second weight for each pixel using the difference between the corresponding pixels of the patch and the central region, obtaining the weight for each pixel by combining the first and the second weights, and computing a weighted sum of pixels in this patch and pixels in other overlapped patches.

In this specific embodiment, the aforementioned Human Visual Preference Modeling module 407 is employed to create HVPM map 408. Since HVPM map 408 is built using LR image 401 and has the same size as LR image 401, it is upscaled to match the size of the reconstructed image by the scaling module 409. There may be various methods to realize the upscaling including bilinear, bicubic, nearest neighborhood, and other interpolation approaches. Then, upscaled HVPM map 410 is used in IBP 406, where the detail visibility of the reconstructed image 405, 411 is optimized based on the human visual preference.

Figure 5:
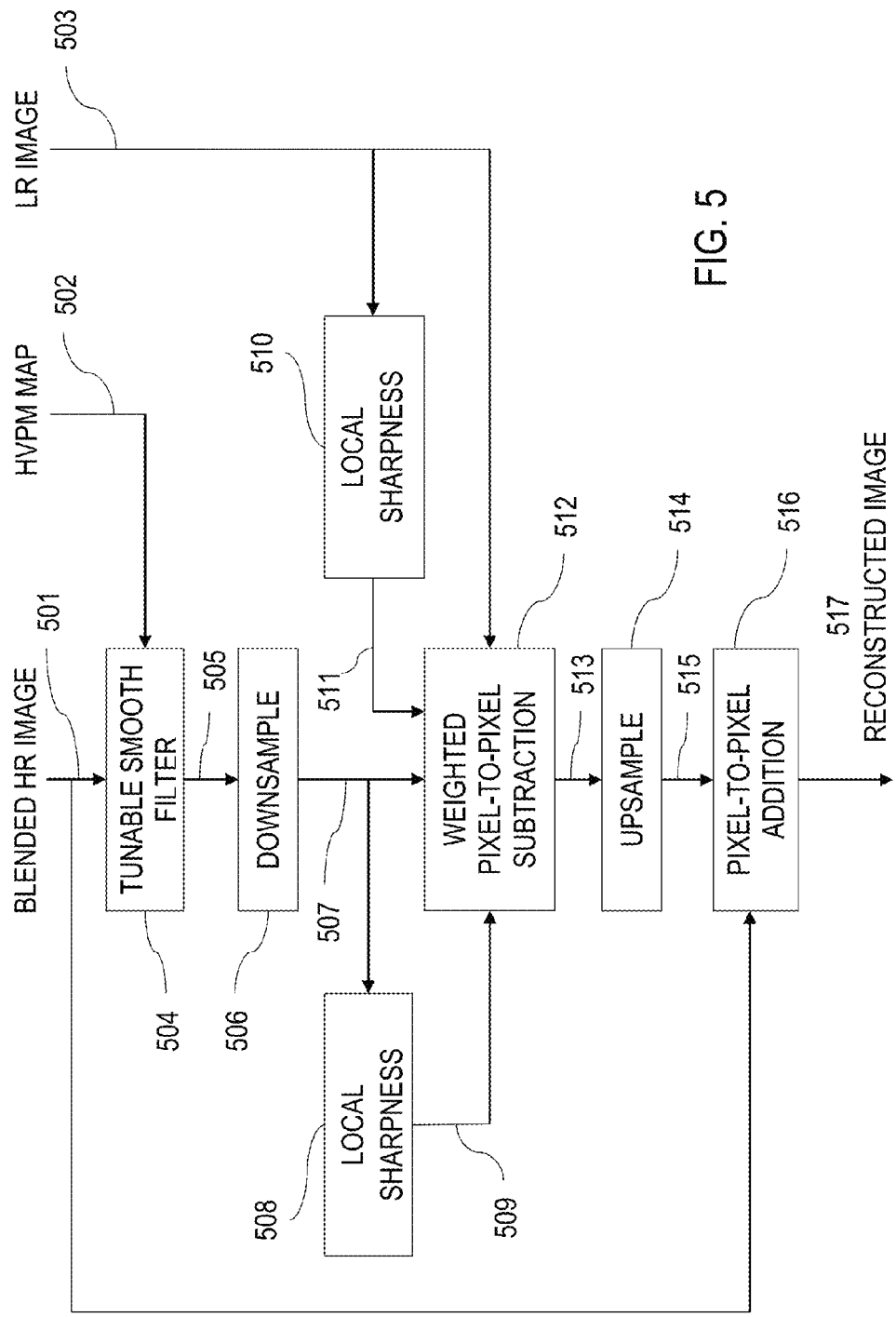
FIG. 5 illustrates an embodiment of VEO-IBP.

FIG. 5 illustrates an embodiment of the Visual Experience Optimized IBP (VEO-IBP). The inputs of the IBP module are blended HR image 501 and original LR image 503 as a reference. A traditional IBP method follows an image degeneration model (or camera model) using smooth filter 504 and downsample 506 blended HR image 501, and then compared intermediate result 507 with reference LR image 503. The differences, residual 513, is then upscaled and added back to the blended image 501. This process keeps the consistency between blended HR image 501 and reference LR image 503, and more importantly, improves the detail visibility of blended image 501. As an ill-posed problem, since there are so many possible solutions when upscaling from 2K×1K pixels to 4K×2K pixels, the SR reconstruction may have a large number of solutions that are consistent with original LR image 503, since four pixels are generated from each original pixel in 2x upscaling. The traditional IBP approach only provides a solution that is optimized to a kind of camera module, which may not be the one optimized for human viewers.

In this specific embodiment of the VEO-IBP illustrated in FIG. 5, HVPM map 502 is used to optimize the solution of IBP to match the human eyes' preference. For those pixels with larger values in HVPM map 502, human eyes prefer more detail information and can tolerate more noise/artifacts. In order to satisfy this kind of preference, stronger smoothing operations can be applied to those pixels to generate more detail information via the following IBP steps. However, more noise/artifacts are generated too.

For those pixels with smaller values in HVPM map 502, human eyes are more sensitive to noise/artifacts, i.e. humans prefer a noise/artifact-free result rather than high detail visibility. In order to satisfy this kind of preference, weaker smoothing operations can be applied to those pixels to generate less detail information but less noise/artifacts are generated by the following IBP steps.

More specifically, in this specific embodiment of VEO-IBP illustrated in FIG. 5, tunable smooth filter 504 tuned by HVPM map 502 is applied to blended HR image 501 instead of the smooth filter with a constant parameter in the traditional IBP. In some embodiments, tunable smooth filter 504 may be a Gaussian filter with variable parameters. For each pixel in blended HR image 501, the corresponding pixel values in the HVPM map are fetched and used to calculate the variance of the Gaussian filter by:

$$\sigma_{VEO} = f_5(m_{HVP}) \tag{13}$$

where $m_{HVP}$ is the pixel value in the corresponding location of the HVPM map and $f_5(\cdot)$ is a function to map the preference degree to the variance parameter of the Gaussian filter. In most embodiments, $f_5(\cdot)$ is a Piece-Wise Linear (PWL) or non-linear function that makes $\sigma_{VEO}$ roughly proportional to the pixel value $m_{HVP}$. Then a Gaussian filter with variance parameter $\sigma_{VEO}$ is applied to this specific location of the blended image. The Gaussian filter may be formulated by:

$$G(u, v) = \frac{1}{2\pi\sigma_{VEO}^2} e^{\left(-\frac{u^2+v^2}{\sigma_{VEO}^2}\right)}. \tag{14}$$

In the specific embodiment as illustrated in FIG. 5, there may be steps 508, 510 to calculate the local sharpness of downsampled image 507 and input LR image 503 respectively. In some embodiments, the local sharpness measurement may be implemented using a local MAD as formulated by Equation (7). In contrast to the traditional IBP, both the local sharpness of downsampled image 507 and the differences of these two sharpness measurements 509, 511 are considered in Weighted Pixel-to-Pixel Subtraction 512 in order to preserve the sharpness (or equivalently, visibility of image details) and avoid over-sharpening. More specifically, assuming that the MADs of pixel (x,y) in the LR image and the blended HR image are $MAD_L(x,y)$ and $MAD_b(x,y)$ respectively, the weighted pixel-to-pixel subtraction can be formulated by:

$$R(x,y) = w_{sh}(x,y) \cdot (I_L(x,y) - I_b(x,y)) \text{ and}$$

$$w_{sh}(x,y) = f_6(MAD_b(x,y) - MAD_L(x,y)) \cdot f_7(MAD_b), \tag{15}$$

where $I_L(x,y)$ and $I_b(x,y)$ are pixels in downsampled image 507 and LR image 503 respectively, $f_6(\cdot)$ and $f_7(\cdot)$ are piece-wise linear or non-linear functions inversely proportional to the argument, and R(x,y) is result residual 513. Equation (15) shows when $MAD_L(x,y) > MAD_b(x,y)$, which means the sharpness in downsampled image 507 (or, equivalently, blended image 501) is insufficient, a larger weight will be assigned to the result of pixel-to-pixel subtraction in order to compensate the sharpness loss in downsampled image 507 (or, equivalently, blended image 501). When $MAD_L(x,y) < MAD_b(x,y)$, which means downsampled image 507 (or, equivalently, blended image 501) is over-sharpened, a smaller weight or zero will be assigned in order to reduce the over-sharpening. Equation (15) also shows when $MAD_b(x,y)$ is large, so that the sharpness in downsampled image 507 (or, equivalently, blended image 501) is sufficient, there will be a smaller weight assigned in order to reduce the over-sharpening.

In this specific embodiment of VEO-IBP illustrated in FIG. 5, the following steps are the same as the traditional IBP method, where residual 513 is then upsampled 514 to obtain upsampled residual image 515, and added back to blended HR image 501 in Pixel-to-pixel Addition 516 in order to obtain updated Reconstructed Image 517. The steps illustrated in FIG. 5 may be repeated a pre-defined number of iterations to gradually improve the sharpness and details visibility of Reconstructed Image 517. In some embodiments, the iteration may be early determined according to some feature measurements on Reconstructed Image 517. These measurements may be statistics of the image, no-reference or reduced-reference image quality assessment approaches, or other approaches to evaluate the quality of the image. In some embodiments, the iteration number for each pixel may be different and determined by local quality assessment similar to the aforementioned methods.

The above description only introduces one embodiment to implement the VEO-IBP. Alternative embodiments may employ other kind of smooth filters such as a boxing filter, bilateral filter, trilateral filter, etc. In some embodiments, the shape of the smoothing filter may be adjusted according to the edge or gradient direction of the pixel to further suppress the artifacts. Some other embodiments may employ other kind of filters to carry out the same purpose of tuning the detail visibility. Moreover, some embodiments may use other kinds of sharpness measurement methods such as gradient profile sharpness, wavelet based, or other spatial and frequency domain methods.

Figure 6:
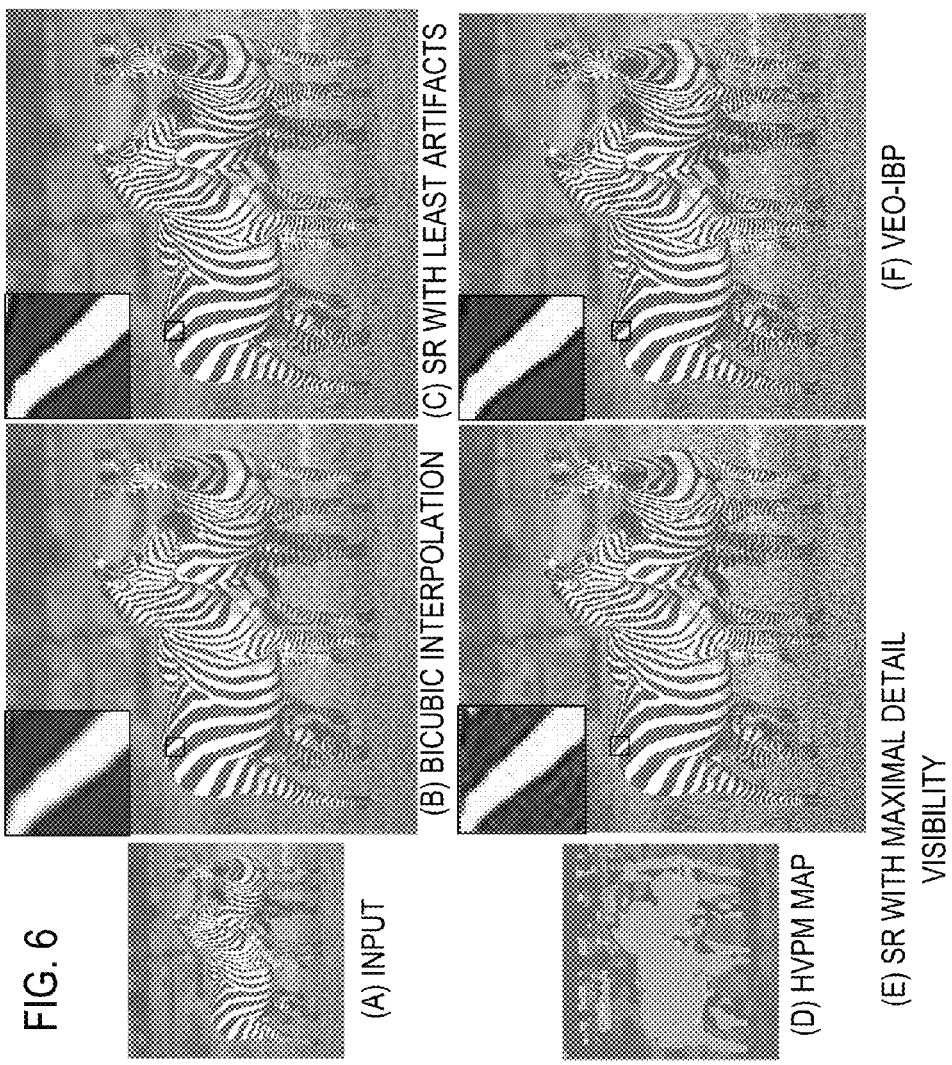
FIG. 6 illustrates an experimental result of VEO-IBP.

FIG. 6 illustrates the advantages of the proposed VEO-IBP. It can be seen that the SR technology that produces images (c), (e) and (f) from input image (a) creates sharper edges and more detail information than the bicubic interpolation that produced image (b). Since SR has multiple solutions, the detail visibility and its accompanying artifacts of the SR reconstruction image can be optimized to various degrees. If the blended image is optimized for the least artifacts using the traditional IBP to generate image (c), the zebra looks sharp and vivid; however, the grass land shows a lack-of-detail. In contrast, if the blended image is optimized for maximal detail visibility as shown in image (e), there will be more detail information visible in the grass land. However, the zebra looks "dirty" due to too many visible details. Part of these "details" come from unavoidable flaws or artifacts generated from the input image. The reason for the unsatisfactory results in images (c) and (e) is that the traditional IBP did not consider the various HVS preferences on different kinds of textures in the image. The proposed method builds a HVPM map as shown in (d), where the darker pixels represent random-texture regions that are insensitive to noise/artifacts (or equivalently prefer more detail visibility), while the lighter pixels represent immaculate regions that are sensitive to noise/artifacts (or equivalently prefer less detail visibility). It can be seen that the HVPM map very closely describes the viewer's subjective experience. For example, the grassland is expected to have a lot of details, while the body of the zebra is expected to be immaculate with a few rough details. In the result of VEO-IBP as shown in image (f), it can be seen that both the zebra and the grassland have details appropriate to HVS's preference, so that it provides a superior visual experience to end users.

In contrast with some image enhancement, tone mapping, or re-lighting approaches that actually change the content of the image, the proposed VEO-IBP uses the pixel-to-pixel subtraction and addition steps 512, 513, 516 as does the traditional IBP. These steps make the VEO-IBP follow the image degeneration assumptions and constraints of super-resolution to some degree. Actually, the VEO-IBP is designed to generate a solution optimal for human visual experience from among a large number of solutions of the ill-posed super-resolution problem, without changing the content of the image.

Figure 7:
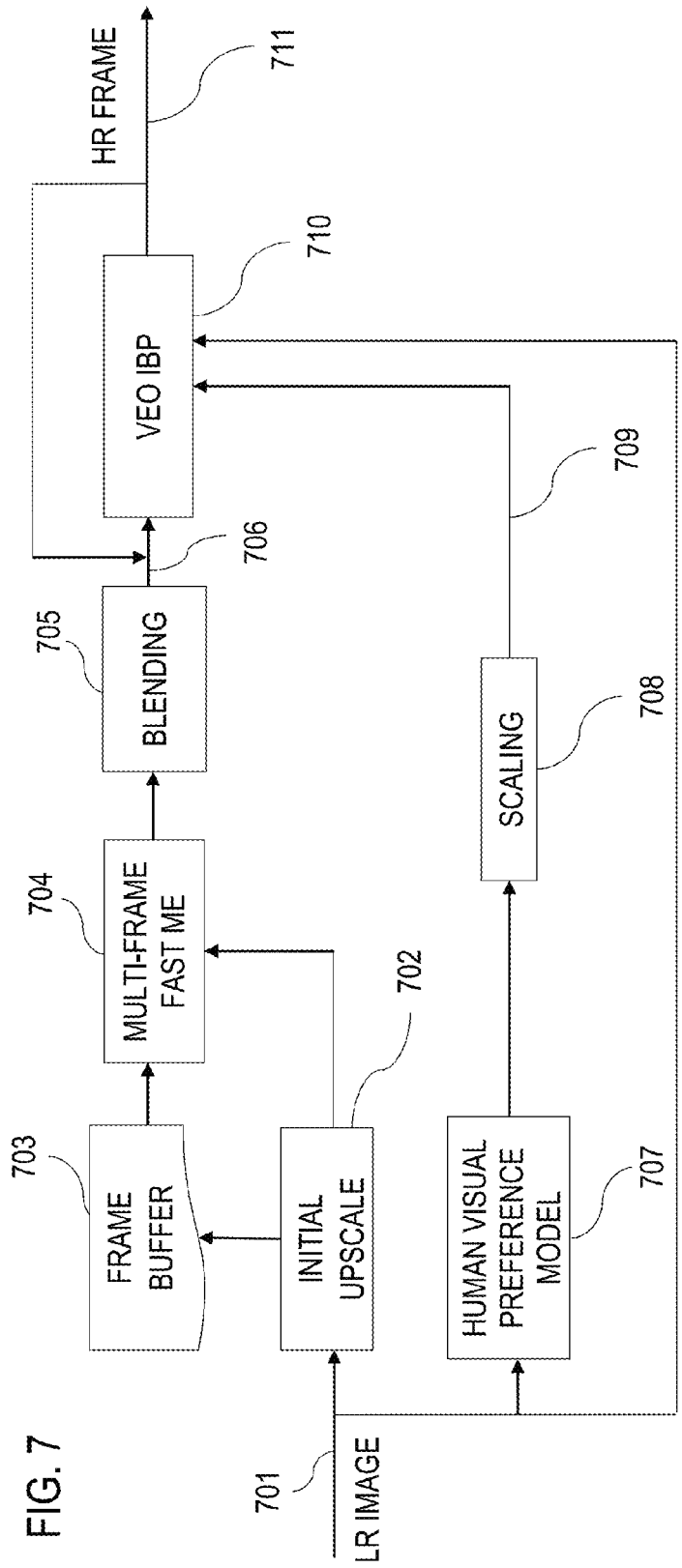
FIG. 7 illustrates an embodiment of multi-frame SR with VEO-IBP.

FIG. 7 illustrates an embodiment using multi-frame SR and VEO-IBP. In this embodiment, multiple LR images or video frames 701 are fed into the SR system to form one HR image or video frame 711. This embodiment follows a traditional multi-frame SR method, where the current input LR frame may be initially partitioned into a plurality of overlapped query patches for further processing. In order to recover sub-pixel misalignments among input LR frames, a sliding window moving in sub-pixel increments may be employed to create these overlapped query patches. In practice, this method can be implemented by initial upscale step 702 where the image values in the sub-pixel locations are interpolated in advance. In some embodiments, other input LR frames are also upscaled in step 702 and stored in Frame Buffer 703. Multi-frame Fast Motion Estimation 704 is applied to search the counterparts of the query patch in Frame Buffer 703. All the searched counterparts are weighted and summed in Blending module 705 to form Reconstructed Image 706.

In this specific embodiment, Human Visual Preference Modeling module 707 and Scaling 708 are used to create upscaled HVPM map 709. Then, upscaled HVPM map 709 is used in VEO-IBP 710, where the detail visibility of reconstructed image 706 is optimized according to the human visual preference.

Figure 8:
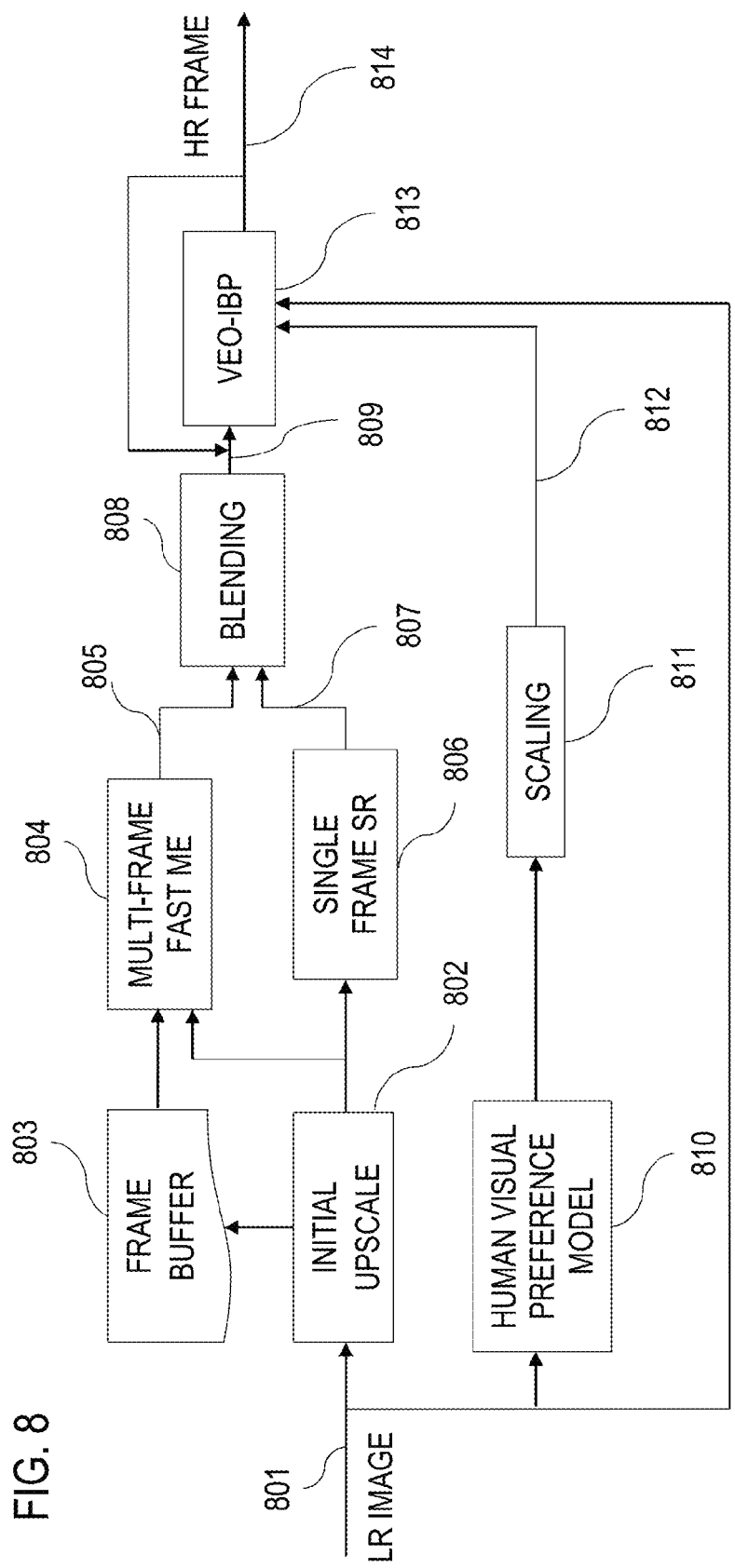
FIG. 8 illustrates an embodiment of single- and multi-frame SR with VEO-IBP.

FIG. 8 illustrates an embodiment using both single- and multi-frame SR methods and VEO-IBP. In this embodiment, multiple LR images or video frames 801 are fed into the SR system to form one HR image or video frame 814. In this embodiment, the multi-frame SR method includes Initial Upscale 802, Frame Buffer 803 and Multi-frame Fast ME 804, which are the same as or similar to those illustrated in FIG. 7. Single-Frame SR 806 may be the same as or similar to the SiSS approach of step 404 in the embodiment illustrated in FIG. 4. In some alternative embodiments, Single-Frame SR 806 may use other example-based methods that search counterpart patches in the input LR frames or in a pre-trained database. All these embodiments of Single-Frame SR 806 may feed the searched or selected HR counterparts, i.e. patches 807, into the Blending module of step 808. In contrast to the aforementioned embodiments, in the embodiment illustrated by FIG. 8, Blending step 808 weighted sums the patches 805, 807 from both the single- and multi-frame SR modules to form Reconstructed HR Image 809. In some embodiments the weights used in Blending step 808 may be determined using similarity between the query patch and the searched counterpart, pixel-to-pixel similarity between the query patch and the searched counterpart, reliability of the motion estimation, motion vector length, etc. In the embodiment illustrated in FIG. 8, the aforementioned Human Visual Preference Modeling module 810 and Scaling 811 are used in the current frame, and then upscaled HVPM map 812 is used in VEO-IBP 813, where the detail visibility of reconstructed image 809 is optimized according to the human visual preference.

Figure 9:
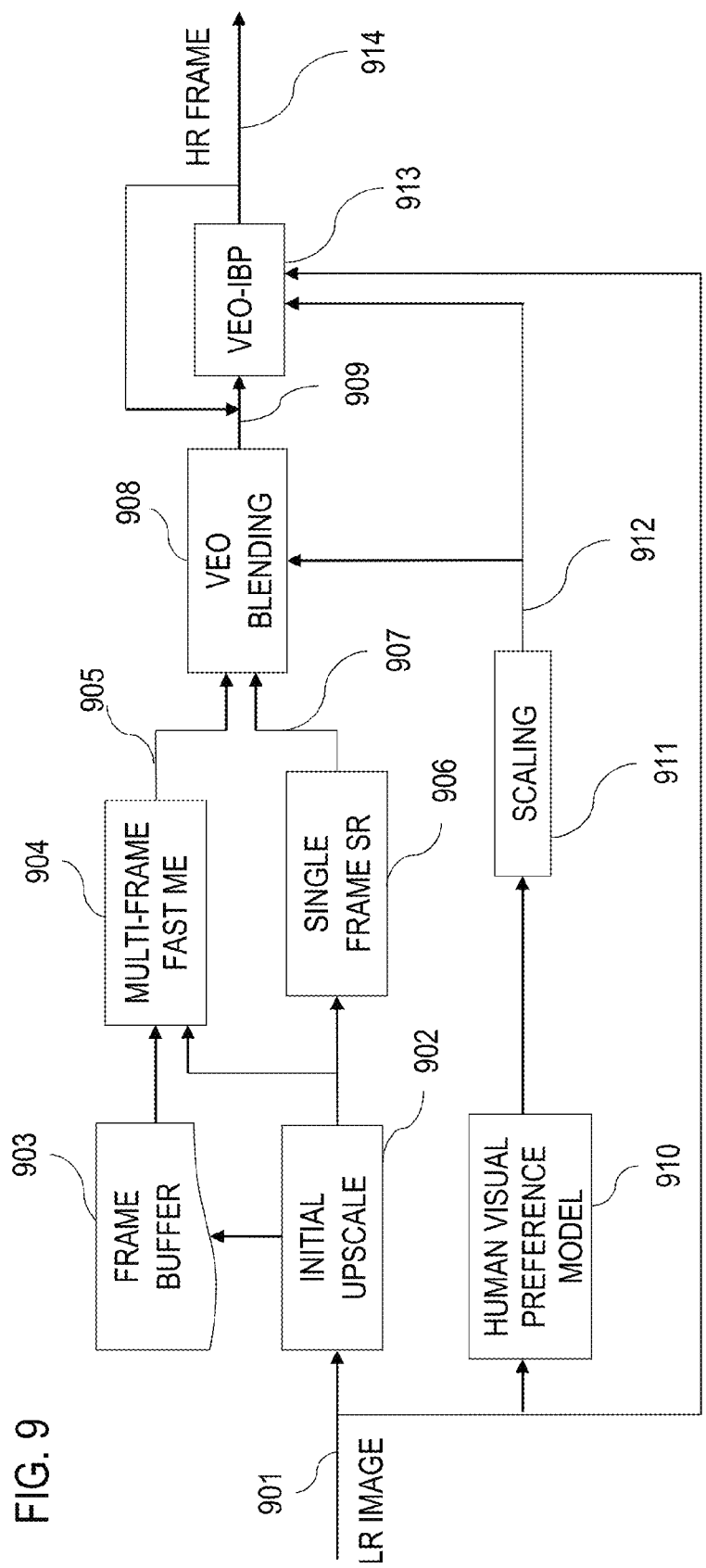
FIG. 9 illustrates an embodiment of single- and multi-frame SR with VEO blending & fusion and VEO-IBP.

FIG. 9 illustrates an embodiment further optimizing the blending and fusion operation to match the human visual preference. In this embodiment, the single- and multi-frame SR, human visual preference model and IBP modules including Initial Upscale 902, Frame Buffer 903, Multi-frame Fast ME 904, Single-frame SR 906, patches 905 from Multi-frame Fast ME 904, patches 907 from Single-frame SR 906, Human Visual Preference Model 910, Scaling 911 and VEO-IBP 913 are the same as the embodiment illustrated in FIG. 8. The difference is that upscaled HVPM map 912 is not only used to optimize the IBP but also used to optimize the blending and fusion in VEO Blending and Fusion 908.

There may be other embodiments similar to this specific embodiment or using some of the modules of this embodiment. For example, some embodiments may only use the single-frame SR including Initial Upscale 902 and Single Frame SR 906, but still use the HVPM to optimize the blending and IBP. Some embodiments may only use the multi-frame SR, but still use the HVPM to optimize the blending and IBP. Some other embodiments may only use the image upscale instead of SR, but still use VEO-IBP 913.

Figure 10:
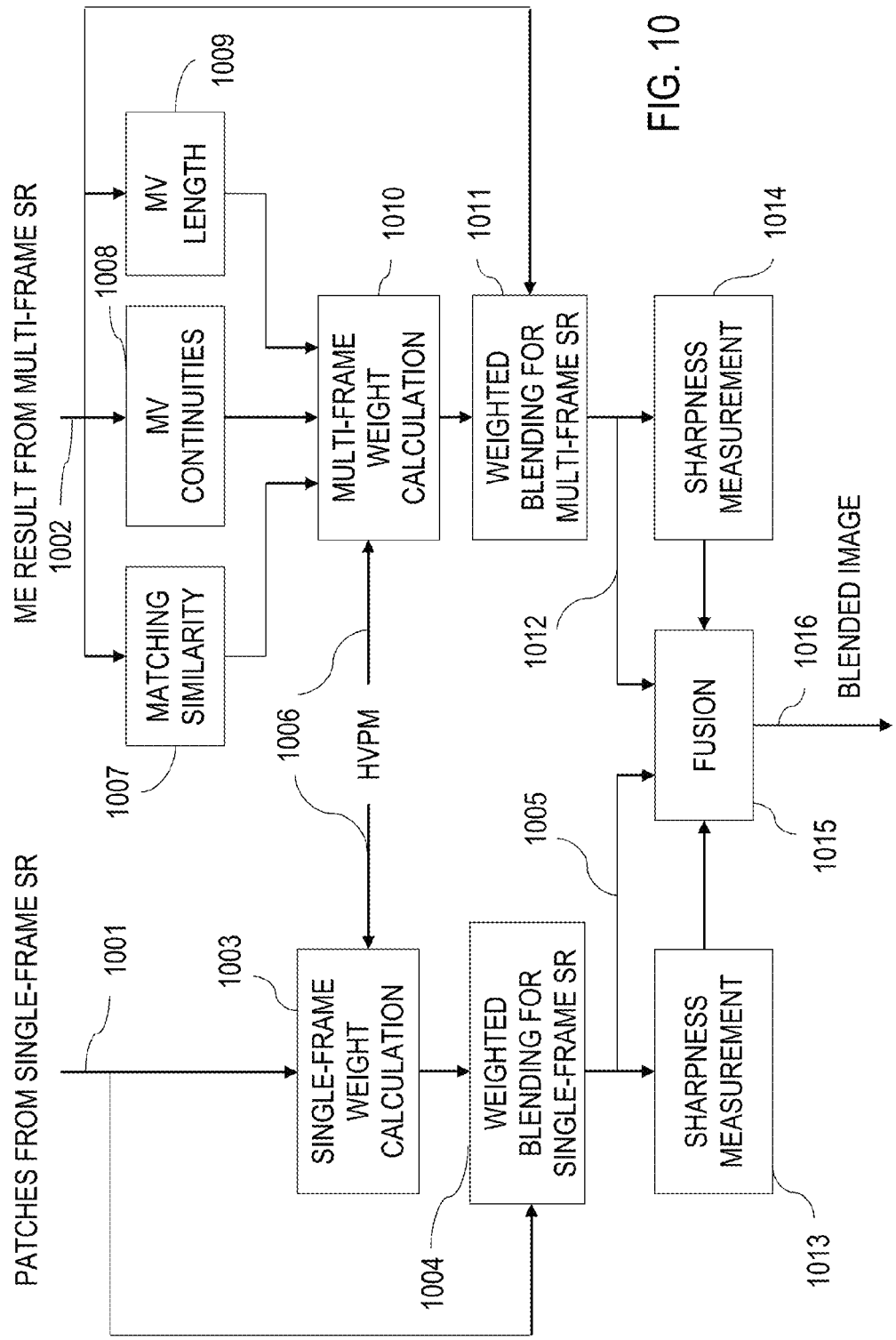
FIG. 10 illustrates an embodiment of VEO blending and fusion.

FIG. 10 illustrates an embodiment of blending and fusion optimized by the human visual preference. The inputs are the patches searched or selected by single-frame SR 1001 and the patches searched in multi-frame SR 1002. As for the Patches from Single-frame SR 1001, the aforementioned HVPM 1006 is involved in Single-frame Weight Calculation 1003 in order to optimize the blending results according to human visual preference. Without loss of generality, assuming the single-frame SR uses the Scale-invariant Self-Similarity (SiSS) based method, the Singe-frame Patch Weight of a pixel (x,y) in a patch P can be calculated as:

$$w_{sf}(x, y) = \exp\left(\frac{siss}{\sigma_{patch}}\right) \cdot \exp\left(-\frac{|P(x, y) - P_\downarrow(u, v)|}{\sigma_{pixel}}\right) \cdot f_8(m_{HVP}(x, y)), \quad (16)$$

where $m_{HVP}(x,y)$, siss, $P(x,y)$, $P_\downarrow(u,v)$, $\sigma_{patch}$ and $\sigma_{pixel}$ are the pixel value in the HVPM map (i.e. the human visual preference measurement), scale-invariant self-similarity measurement of the patch, pixel value in the patch, pixel value in the downsampled patch, and the parameters to tune the sensitivities respectively. In the equation, the first and second exponent terms reflect the patch similarity and pixel-to-pixel similarity measurements respectively, which have been used in some prior art. These two terms assign the "high-quality" pixels (i.e. pixels more likely to contain the true high resolution information according to the patch and pixel-to-pixel similarities) larger weight. In the last term, $f_8(\cdot)$ is a piece-wise linear or non-linear function roughly inversely proportional to the argument. Different from the prior art, this new term enlarges the weight differences between the "high-quality" and "low-quality" patch pixels when the human visual preference measurement mHVP(x,y) has a small value (i.e. HVS is sensitive to noise/artifacts). This new term reflects the fact that when HVS is sensitive to noise/artifacts it should assign an extra or higher weight to the "high-quality" pixel, and conversely, should assign a lower weight to the "low-quality" pixel. This strategy can suppress the artifacts caused by the "low-quality" pixels. It also reflects the fact that when the HVS is insensitive to noise/artifacts, similar weights should be assigned to all pixels in order to fully utilize the information in the patches, while ignoring the noise/artifacts caused by the "low-quality" pixels. After calculating the weight, all the pixels of all the patches from the single-frame SR are weighted and summed in Weighted Blending for Single-frame SR module 1004 in order to form single-frame reconstructed HR image 1005.

As for the ME result from Multi-frame SR 1002, first some measurements such as Matching Similarity 1007, Motion Vector Continuities 1008 and Motion Vector Length 1009 are calculated. These measurements have been used in calculating the ME reliability in some prior art. Different from the prior art, the embodiment illustrated by FIG. 10 uses the aforementioned HVPM 1006 in the Multi-frame Weight Calculation 1010 to optimize the weight calculation. Without loss of generality, the Multi-frame Patch Weight for a pixel (x,y) in the patch searched in ME can be calculated as:

$$w_{mf}(x, y) = \quad (17)$$
$$\exp\left(-\frac{\sqrt{SAD}}{\sigma_{sad}}\right) \cdot \exp\left(-\frac{MVC}{\sigma_{mvc}}\right) \cdot \exp\left(-\frac{|MV|}{\sigma_{mv}}\right) \cdot f_9(m_{HVP}(x, y)),$$

where SAD, MVC, |MV|, $m_{HVP}(x,y)$, $\sigma_{sad}$, $\sigma_{mvc}$ and $\sigma_{mv}(x,y)$ are the sum of absolute difference between the query patch and the search patch in ME, the motion vector continuity measurement, the length of the motion vector, the pixel value in the HVPM map and parameters to tune the sensitivities to the SAD, MVC and |MV| respectively. In the last term, $f_9(\cdot)$ is a piece-wise linear or non-linear function roughly inversely proportional to the argument. Different from the prior art, this new term enlarges the weight differences between the "high-quality" and "low-quality" patches when the human visual preference measurement $m_{HVP}(x,y)$ has a small value (i.e. HVS is sensitive to noise/artifacts) and vice versa. This strategy is the same as the weighting method for single-frame SR as described in Equation (16). After calculating the weight, all the pixels of all the patches from single-frame SR are weighted and summed in Weighted Blending for Multi-frame SR module 1011 in order to form multi-frame reconstructed HR image 1012.

Considering that the single-frame SR can reconstruct sharper strong edges while multi-frame SR can recover more detail information in random texture regions, the embodiment illustrated by FIG. 10 also employs Sharpness Measurement modules 1013, 1014 to obtain the local sharpness measurement of each pixel in blended images 1005, 1012 respectively. In some embodiments, the sharpness measurement can be realized using the local MAD as described in Equation (7). Then, the pixels from the single-frame SR and multi-frame SR are fused in Fusion module 1015 to form final Blended Image 1016. More specifically, the fusion can be formulated by:

$$I_h(x, y) = \frac{w_{ssf}(x, y) \cdot I_{sf}(x, y) + w_{smf}(x, y) \cdot I_{mf}(x, y)}{w_{ssf}(x, y) + w_{smf}(x, y)} \text{ and} \quad (18)$$
$$w_{ssf}(x, y) = f_{10}(s_{sf})$$
$$w_{smf}(x, y) = f_{11}(s_{mf}),$$

where $I_{sf}(x,y)$, $I_{mf}(x,y)$, $s_{sf}(x,y)$ and $s_{mf}(x,y)$ are the pixel from single-frame reconstructed HR image 1005, pixel from multi-frame reconstructed HR image 1012, sharpness measurement on $I_{sf}(x,y)$, and sharpness measurement on $I_{mf}(x,y)$ respectively. In equation (18), $f_{10}(\cdot)$ and $f_{11}(\cdot)$ are piece-wise linear or non-linear functions proportional to the argument, which are used to tune the sensitivities to the sharpness measurements. In some other embodiments, the fusion described by Equation (18) may be replaced by the following weighting strategy. The weight of a pixel from single-frame reconstructed HR image 1005 is set larger than the weight of a pixel from multi-frame reconstructed HR image 1012 for pixels in the structured regions. Similarly, the weight of a pixel from single-frame reconstructed HR image 1005 is set smaller than the weight of a pixel from multi-frame reconstructed HR image 1012 for pixels in the random-texture regions.

Figure 11:
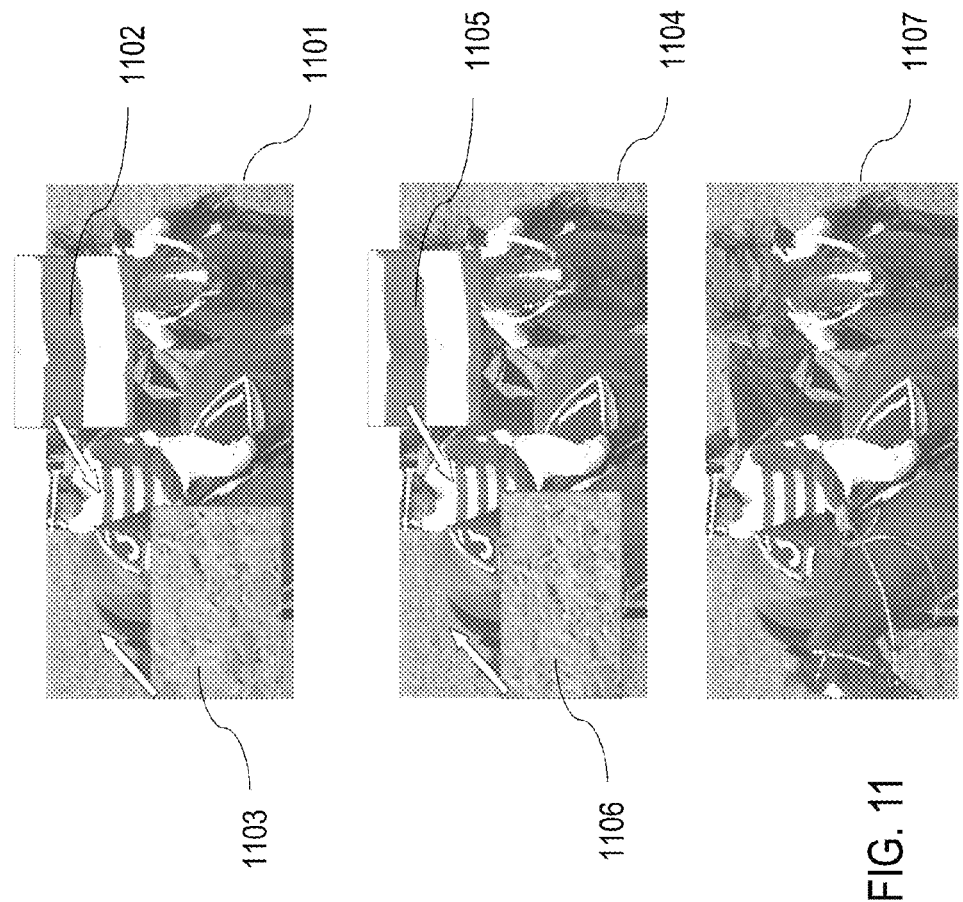
FIG. 11 illustrates an experimental result of VEO blending and fusion.

FIG. 11 illustrates the superiority of the proposed blending and fusion method. In the blending result of single-frame SR, image 1101, the regular region 1102 was reconstructed with a sharp and clean appearance, but the random texture region 1103 was reconstructed with less detail information. In the blending result of multi-frame SR, image 1104, the random texture region 1106 was reconstructed with more detail information, but the regular region 1105 appears to be less sharp. If the patches from the single-frame SR and the multi-frame SR are blended and fused using the embodiment illustrated in FIG. 10, both the regular and random texture regions have appropriate sharpness and detail visibility as shown in the fusion result image 1107.

Although the proposed VEO Blending adjusts the weights according to some subjective criteria, it is based on the objective patch searching/selection results under the single- and/or multi-frame SR framework. Therefore, the VEO blending result is still a solution of super-resolution reconstruction, but with some bias to balance the artifacts and the detail information in terms of HVS's preference. Together with the VEO-IBP, the whole embodiment is designed to generate a solution optimal for human visual experience from among a large number of solutions of the ill-posed super-resolution problem, without changing the content of the image.

Figure 12:
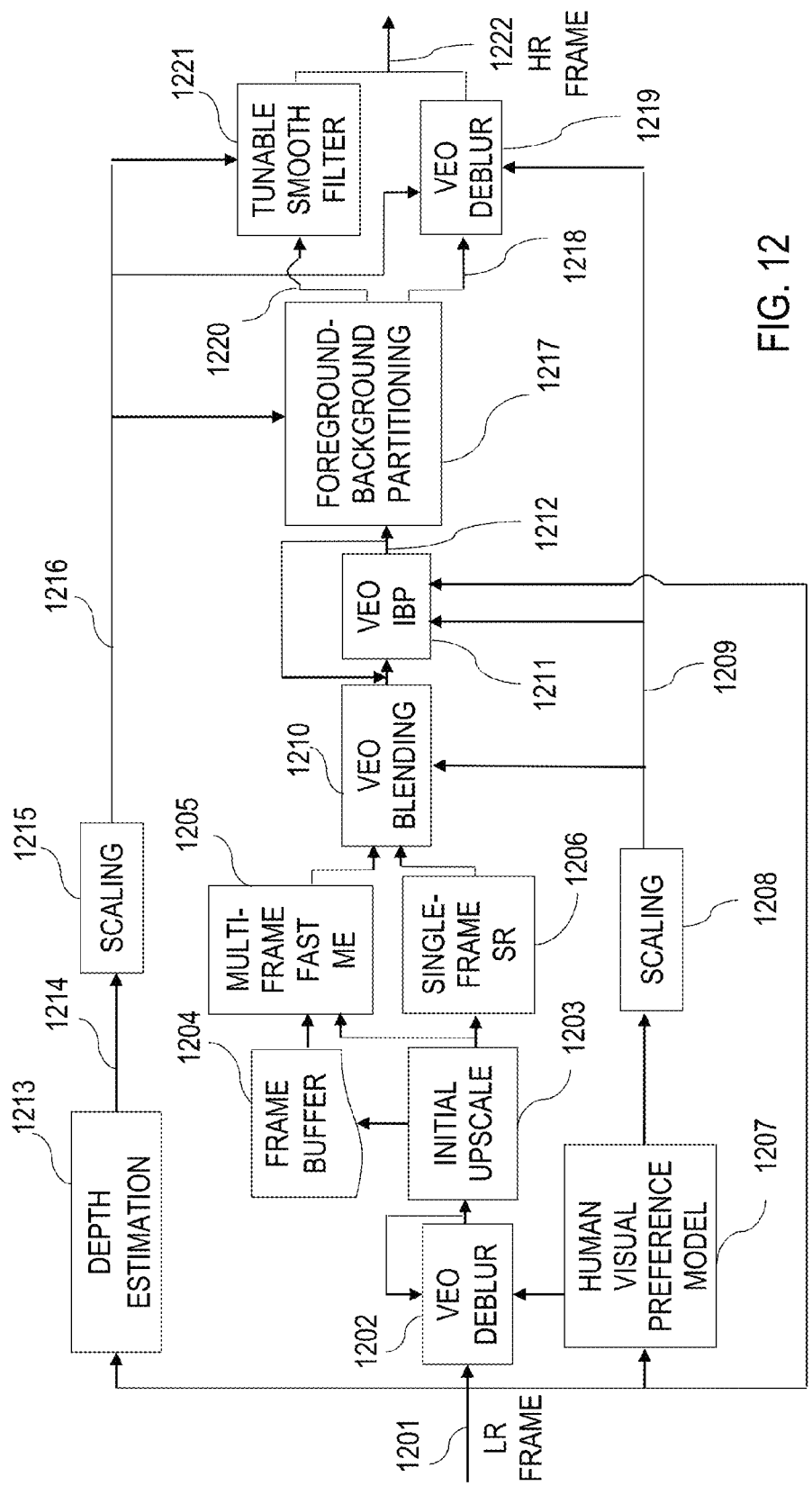
FIG. 12 illustrates an embodiment of SR with "Hallucinated 3D".

FIG. 12 illustrates an embodiment further enhancing the depth sense of the 2D image and video frame using the aforementioned visual experience optimization technology. In the embodiment, the single- and multi-frame SR, HVPM, VEO blending and fusion, VEO-IBP modules 1203, 1204, 1205, 1206, 1207, 1208, 1210 and 1211 are the same as the embodiment illustrated in FIG. 9. The new features include Depth Estimation module 1213 followed by Scaling module 1215, Foreground-Background Partitioning module 1217, Tunable Smooth Filter 1221 and VEO Deblur module 1219 to selectively smooth and deblur reconstructed image 1212 according to the depth and the human visual preference. The embodiment may further include VEO Deblur module 1202 as the pre-processing stage of the whole approach in order to remove any original blur in the LR frame.

In the embodiment illustrated in FIG. 12, Depth Estimation module 1213 estimates the depth of each pixel of the input LR frame using 2D depth cues and then generates Depth Map 1214. In some embodiments, the estimation may be based on local sharpness, local contrast, gradient profile sharpness, wavelet based or other spatial and frequency domain methods. In other embodiments, the input LR frame is stereo or multi-view, or accompanied by a depth map. In this case, the system is used to display stereo or 3D content on a 2D display. When the input LR image is stereo or multi-view, some embodiments may estimate the depth using a disparity calculation based on motion estimation between or among views. When the input LR image is accompanied by a depth map, Depth Estimation module 1213 may be bypassed. Then, depth map 1214 is upscaled in Scaling module 1215 to match the size of the reconstructed HR image 1212. The upscaling method in Scaling module 1215 may use nearest neighborhood or other interpolation methods.

Next, Foreground-Background Partitioning module 1217 classifies the pixels in reconstructed HR image 1212 into foreground 1218 and background 1220 according to depth estimation result 1216. In some embodiments, the foreground and background are partitioned using a threshold. When the depth estimation of a pixel is smaller than the threshold, the pixel will be classified as foreground, and vice versa. In some embodiments, the threshold may be determined by a pre-defined value, the average depth of the pixels in the central region of the frame, the average depth of the pixels in a pre-defined region, etc.

Finally, VEO Deblur module 1219 applies deblur operations to those pixels that are classified as "foreground". The strength of the deblur operations are tuned according to both the depth estimation and the HVPM map in order to make the nearer objects appear sharper and to keep the sharpness preferred by the human visual preference.

As for pixels that are classified as "background", Tunable Smooth Filter 1221 is applied to make the further objects more blurry by tuning the parameters of the smooth filter according to the depth estimation. Assuming the depth of a "background" pixel is $d_b$ and the threshold used in Foreground-Background Partitioning module 1217 is $d_0$, the tunable smooth filter may be a Gaussian filter with a variable variance parameter as formulated by:

$$G(u, v) = \frac{1}{2\pi\sigma_d^2} e^{\left(-\frac{u^2+v^2}{\sigma_d^2}\right)} \text{ and } \sigma_d = f_{12}(d_b - d_0) \quad (19)$$

where $f_{12}(\cdot)$ is a piece-wise linear or non-linear function roughly proportional to the argument to tune the sensitivities to the depth. Some embodiments may implement the smooth filter using other low-pass filters, bilateral filters and trilateral filters with variable parameters tuned by the depth.

Since blurriness is an important depth cue in the 2D image, when the sharpness differences between the foreground and the background are enhanced using the aforementioned approach, output HR frame 1222 has stronger depth sense for the HVS. As a result, HR frame 1222 will look more vivid as if it is the real 3D scene. In some sense, the embodiment illustrated in FIG. 12 may be called as a "hallucinated 3D" technology.

There may be other embodiments to realize the "hallucinated 3D" effect using some of the modules in the embodiment illustrated in FIG. 12. Some embodiments may use only the single-frame or multi-frame SR modules. Some embodiments may use only the initial upscale and the VEO-IBP modules. In case the input frame is high definition, some embodiments may use all or some of those modules including Depth Estimation module 1213, Foreground-Background Partitioning module 1217, Human Visual Preference Module 1207, Tunable Smooth Filter 1221 and VEO Deblur 1219 to enhance the 3D experience of the input frame. Moreover, some embodiments may use out-of-focus (i.e. defocus) estimation instead of Depth Estimation module 1213 to obtain a similar effect of depth sense enhancement.

Figure 13:
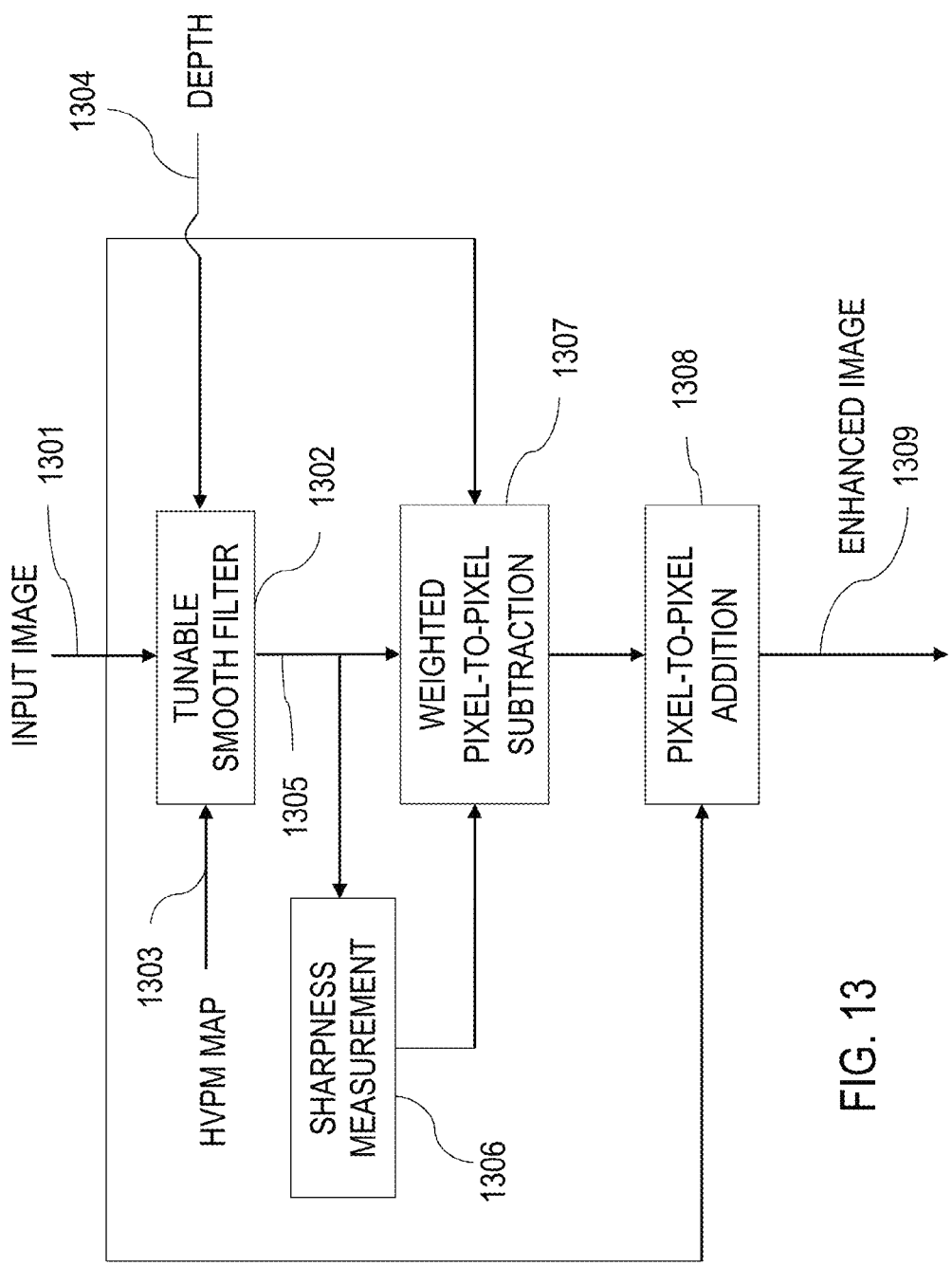
FIG. 13 illustrates an embodiment of VEO Deblur for "Hallucinated 3D".

FIG. 13 illustrates an embodiment of VEO Deblur module 1219 in the embodiment described in FIG. 12. Input Image 1301 is first processed by Tunable Smooth Filter 1302, with parameters determined by both depth estimation 1304 and the aforementioned HVPM map 1303. Assuming the depth of a "foreground" pixel is $d_f$ and the threshold used in Foreground-Background Partitioning module 1217 is $d_0$, the tunable smooth filter may be a Gaussian filter with a variable variance parameter as formulated by:

$$G(u,v) = \frac{1}{2\pi\sigma_f^2} e^{\left(-\frac{u^2+v^2}{\sigma_f^2}\right)} \text{ and } \sigma_f = f_{13}(d_0 - d_f) \cdot f_{14}(m_{HVP}),\quad(20)$$

where $f_{13}(\cdot)$ and $f_{14}(\cdot)$ are piece-wise linear or non-linear functions roughly proportional to the argument to tune the sensitivities to the depth and the human visual preference respectively. The $2^{nd}$ term in Equation (20) can limit the smoothing strength, so that it can avoid over-sharpening in terms of the human eyes' preference. Some embodiments may implement the smoothing filter using other low-pass filters, bilateral filters and trilateral filters with variable parameters tuned by the depth and the HVPM map.

Similar to the VEO-IBP, the embodiment illustrated in FIG. 13 also performs Sharpness Measurement 1306 on filtered pixel 1305. Then, Weighted Pixel-to-pixel Subtraction module 1307 calculates the weighted difference between the filtered foreground pixels and the original foreground pixels. Assuming the sharpness is measured by local MAD as described in Equation (7), the weighted subtraction can be formulated by:

$$R(x,y)=w_s(x,y)\cdot(I_F(x,y)-I_s(x,y)) \text{ and } w_s(x,y)=f_{15}(MAD_b),\quad(21)$$

where $I_F(x,y)$ and $I_s(x,y)$ are foreground pixel 1301 and filtered pixel 1305 respectively, and $f_{15}(\cdot)$ is a piece-wise linear or non-linear function inversely proportional to the argument. Finally, residual R(x,y) in Equation (15) is added back to original Foreground Pixels 1301 in Pixel-to-pixel Addition module 1308.

The embodiment illustrated by FIG. 13 applies stronger deblur operations to the foreground pixels. Therefore, the nearer objects in the image will appear sharper and vice versa, which matches human being's perception of objects with depth. The HVPM map 1303 and Sharpness Measurement 1306 applied in the deblur can avoid over-sharpening in terms of human eyes' sensitivity, so that the deblur can create a more vivid enhanced image 1309 with a better visual experience.

The above description only introduces one embodiment to implement the VEO Deblur. Alternative embodiments may employ other kinds of smoothing filters such as boxing filter, bilateral filter, trilateral filter, etc. In some embodiments, the shape of the smoothing filter may be adjusted according to the edge or gradient direction of the pixel to further suppress the artifacts. Some other embodiments may employ other kinds of filters to carry out the purpose of tuning the detail visibility. Moreover, some embodiments may use other kinds of sharpness measurement methods such as gradient profile sharpness, wavelet based, or other spatial and frequency domain methods.

Figure 14:
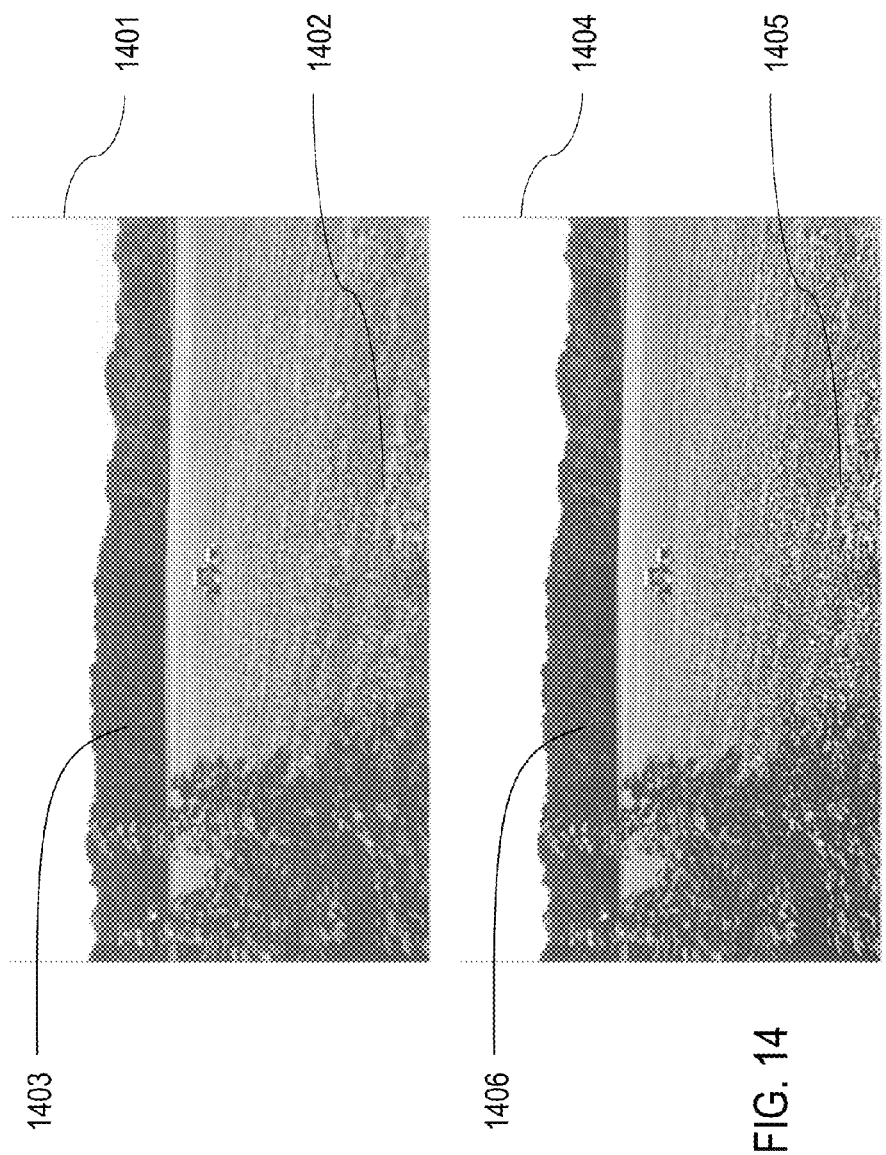
FIG. 14 illustrates an experimental result of "Hallucinated 3D".

FIG. 14 shows the effectiveness of the "Hallucinated 3D" implemented by the embodiment illustrated by FIG. 12 and FIG. 13. In original image 1401, the sharpness of foreground pixels 1402 and background pixels 1403 are slightly different due to atmospheric distortion or haze. Using the sharpness and other cues, the depth of each pixel can be roughly estimated. Then, the embodiment illustrated by FIG. 12 and FIG. 13 enlarges the sharpness differences between the foreground and background regions by selectively deblurring foreground pixels 1405 and smoothing the background pixels 1406. As a result, enhanced image 1404 looks more like a 3D scene. Since the HVPM is used in VEO Deblur 1219 in the embodiments, the sharpness in region 1405 matches the HVS preference better.

Figure 15:
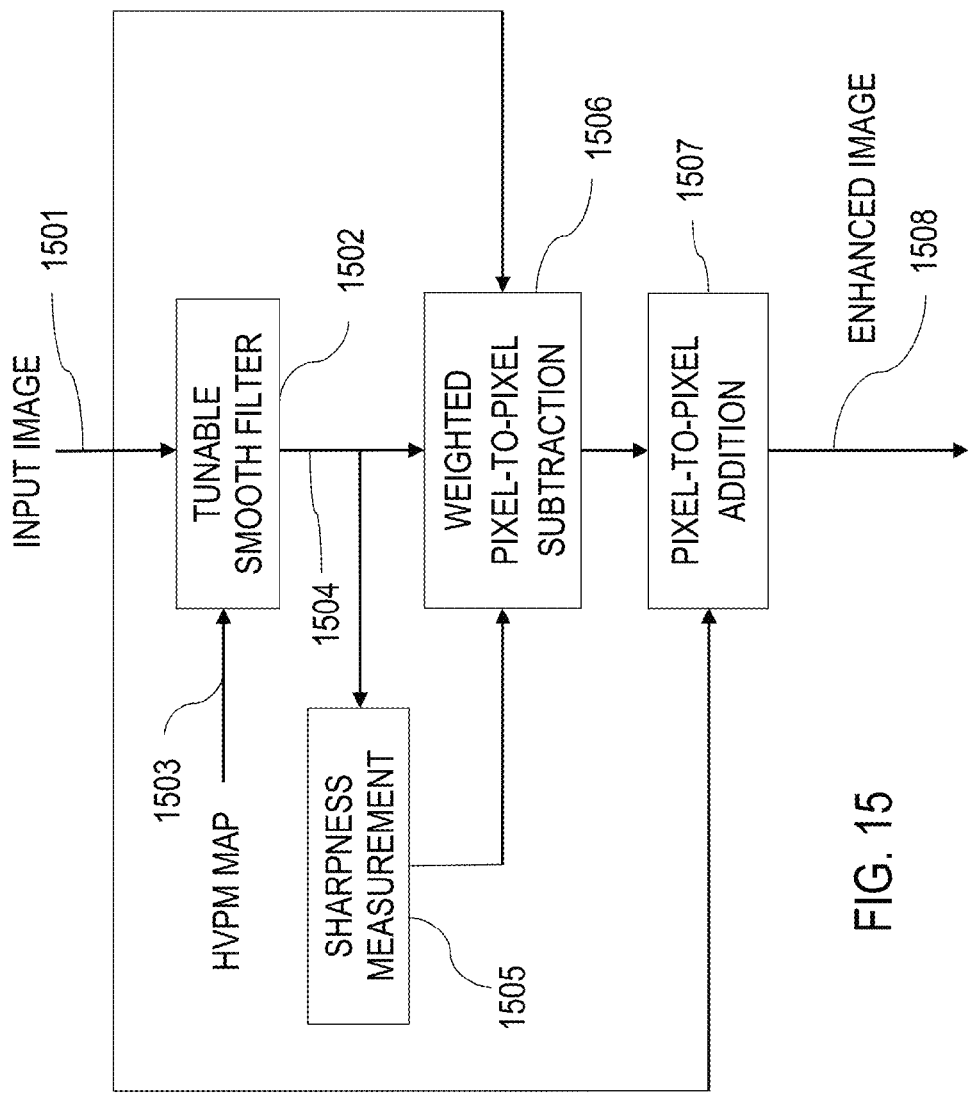
FIG. 15 illustrates an embodiment of VEO Deblur for pre-processing.

FIG. 15 illustrates an alternative embodiment of the VEO Deblur, which can be used as pre-processing stage 1202 of the embodiment illustrated by FIG. 12. Input Image 1501 is first processed by Tunable Smooth Filter 1502, whose parameters may be determined by the aforementioned HVPM map 1503. In some embodiments, the tunable smooth filter may be a Gaussian filter with a variable variance parameter as formulated by:

$$G(u,v) = \frac{1}{2\pi\sigma_f^2} e^{\left(-\frac{u^2+v^2}{\sigma_f^2}\right)} \text{ and } \sigma_f = f_{16}(m_{HVP}),\quad(22)$$

where $m_{VPH}$ is the pixel value in HVPM map 1503 and $f_{16}(\cdot)$ is a piece-wise linear or non-linear functions roughly proportional to the argument to tune the sensitivities to the human visual preference respectively. HVPM map 1503 can limit the smoothing strength, so that it can avoid over-sharpening in terms of the human eyes' preference. Some embodiments may implement the smoothing filter using other low-pass filters, bilateral filters, and trilateral filters with variable parameters tuned by the HVPM map. The following steps 1505, 1506 and 1507 are the same as described for the embodiments illustrated by FIG. 13.

Figure 16:
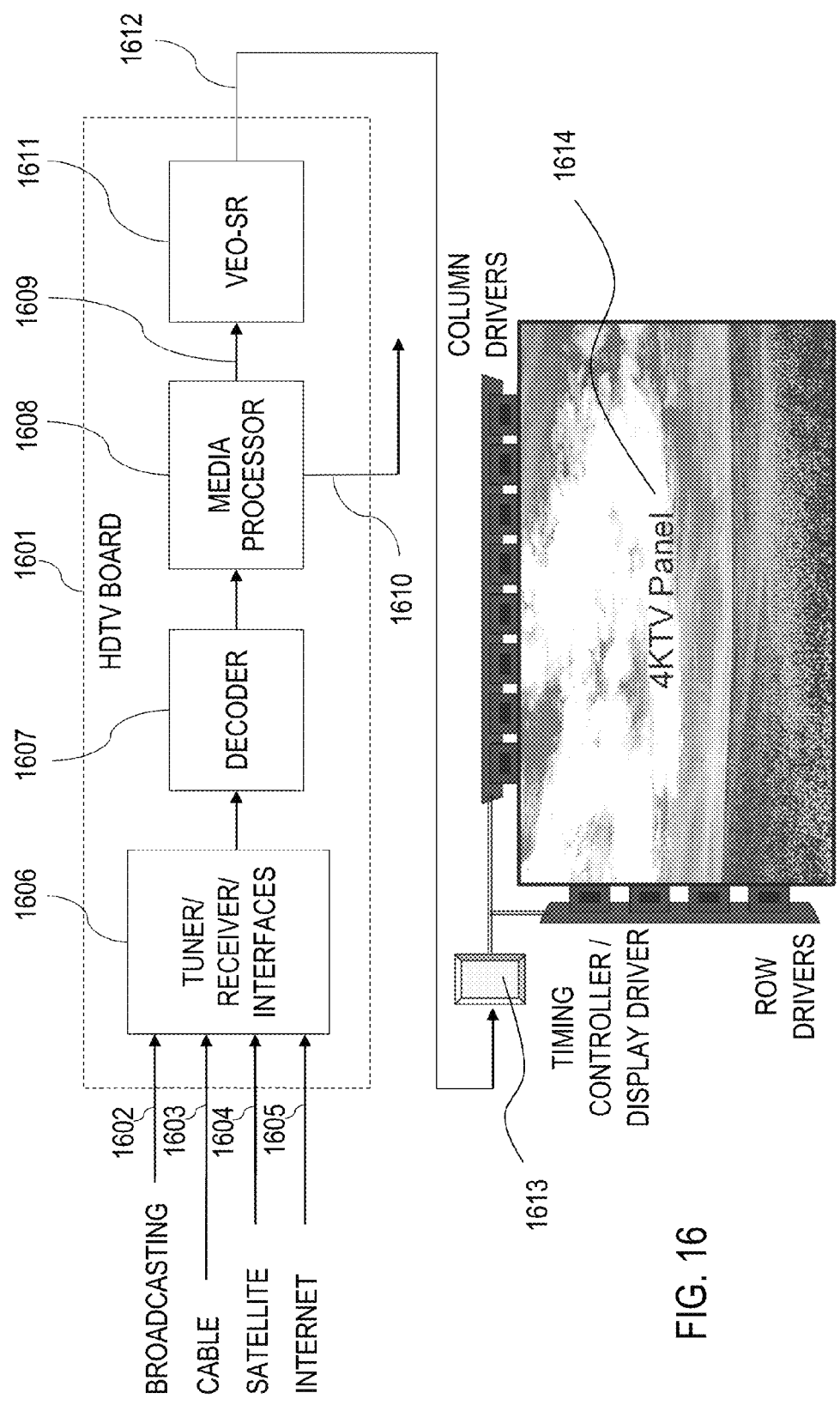
FIG. 16 illustrates an example application of VEO-SR.

FIG. 16 illustrates an example of the proposed technology in an application environment. The aforementioned embodiments can be implemented as VEO-SR 1611, in HDTV Board 1601. The input of HDTV Board 1601 may be signals from Broadcasting 1602, Cable 1603, Satellite 1604 and Internet 1605, which may be received, amplified, demodulated and/or decoded in Tuner/Receiver/Interface module 1606. Then, Decoder 1607 decodes the audio and HD video streams and feeds them into Media Processor 1608 for further processing and composing with other contents such as graphics and OSD. Audio data 1610 may be used to drive the audio devices and video data 1609 is further processed by VEO-SR module 1611. VEO-SR module 1611 then performs the resolution conversion and enhancement optimized for human visual preference, and outputs 4K video stream 1612 to Timing Controller/Display Driver module 1613 to finally drive 4KTV Panel 1614.

In some embodiments, VEO-SR module 1611 may be implemented by an isolated FPGA or ASIC. In some other embodiments, VEO-SR module 1611 may be integrated into the ASIC together with other components such Tuner/Receiver/Interface module 1606, Decoder 1607 and Media Processor 1608. In some embodiments, the VEO-SR module 1611 may be realized as a software component in Media Processor 1608. There may be various other embodiments that implement the proposed VEO-SR technology in other devices such as STB, A/V receiver, media player or other software to support applications such as video transcoding, content making, editing, re-distribution, etc.

Alternate Embodiments

Several other embodiments are contemplated by the inventors. For example the various operations and functions could be pipelined and performed in parallel. Buffering and pipelining registers or delays could be added. Multi-frame processing uses at least 2 frames, with 3 frames being a computationally efficient number of frames to search for each output frame. While an upscaling system has been described, other systems could benefit from the human preference values. For example, an image sharpener could use preference values to determine regions to not sharpen the image, such as flat, corner, regular-structure, or low randomness regions where artifacts are especially annoying to a human. Preference values are especially useful for upscaling since many artifacts tend to be created, as the number of pixels is jumping from 2K×1K to 4K×2K when upscaling for a 4K TV.

The values of various parameters, constants, measurements, etc. that have been shown or described as examples. Parameters constants, measurements, etc. may have other values that those described. While some examples and description have described two outcomes, there may be a range of outcomes. For example, while structured regions that use Single Frame (SF) inputs and random-texture regions that receive Multi-Frame inputs have been described, there may be a wide range of blending of SF and MF results. The degree of anisotropy may indicate a degree of blending, or determine weights for blending as one of many factors. Sometimes other factors may cause a region with a higher degree of anisotropy to receive more smoothing than a region with lower anisotropy, since other factors also determine blending. Thus in a real system many factors may be present.

The method or process steps may be implemented by a hardware device such as a controller or an array of logic gates, ASIC, FPGA, custom Integrated Circuit (IC) chip, or a graphics engine. A processor may execute instructions in firmware or in a semiconductor memory such as a dynamic-random-access memory (DRAM), static random-access memory (SRAM), or electrically-erasable programmable read-only memory, (EEPROM) or flash memory, or a hardwired ROM. Instructions for routines may be copied from a mass storage device to the semiconductor memory for execution by the hardware. Various combinations of hardware, software, and firmware may be used. Functions may be implemented as values in a Look-Up Table (LUT) such as a ROM. The functions may be defined by the values stores in each memory address or location, and may implement PWL, non-linear, or arbitrary functions.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, means, methods and steps described in the specification. As one of ordinary skill in the art will readily appreciate from the disclosure of the present invention, processes, machines, manufacture, means, methods, or steps, presently existing or later to be developed that perform substantially the same function or achieve substantially the same result as the corresponding embodiments described herein may be use according to the present invention. Accordingly, the appended claims are intended to include within their scope such processes, machines, manufacture, compositions of matter, means, methods, or steps.

The background of the invention section contains background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include pictures or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A visual-experience optimized image processor comprising:

an input receiving an input frame of pixels in a sequence of input frames having a low resolution;

an output for outputting an output frame of pixels in a sequence of output frames having a high resolution, wherein the output frame comprises at least two times a number of pixels in the input frame;

an upscaler for generating additional pixels in the output frame from pixels in the input frame using image processing routines that also generate visual artifacts that are not present in the input frame;

a region classifier that identifies structured regions and random-texture regions within a frame of pixels, the region classifier indicating a random-texture region when a measurement of anisotropy among pixels in a region is higher than a threshold, the region classifier indicating a structured region when the measurement of anisotropy among pixels in the region is lower than the threshold;

wherein the random-texture regions have a degree of anisotropy that is lower than in the structured regions; and an optimizer that selects an image processing routine that generates fewer visual artifacts and diminishes visual details when the upscaler processes the structured regions, the optimizer selecting an image processing routine that generates more visual artifacts and enhances visual details when the upscaler processes the random-texture regions, whereby visual artifacts and visual details are diminished for the structured regions and are enhanced for the random-texture regions in the output frame.

2. The visual-experience optimized image processor of claim 1 further comprising:
a Human-Visual-Preference Model (HVPM) map having a plurality of preference values for pixels in a frame;
wherein a preference value includes the measurement of anisotropy generated by the region classifier;
wherein the optimizer reads the HVPM map to select the image processing routine by selecting parameters that control the image processing routine or by selecting from among a plurality of image processing routines;
wherein the HVPM map controls image processing to reduce visual artifacts for the structured regions, and to enhance details and visual artifacts in the random-texture regions.

3. The visual-experience optimized image processor of claim 2 wherein the region classifier further comprises:
a gradient generator for generating a gradient for a region, the gradient indicating a measurement of flatness in the region;
a structure tensor generator for generating a tensor from the gradient, the structure tensor indicating a measure of structures within the region;
a corner detector to detect corners;
an eigenvalue generator that solves the structure tensor to generate a first eigenvalue and a second eigenvalue for the region;
a measurement generator that generates the measurement of anisotropy for the region as a degree of relative discrepancy between the first eigenvalue and the second eigenvalue; and
a human preference value generator that generates the preference values by combining the measurement of anisotropy with a Just-Noticeable Difference (JND) model.

4. The visual-experience optimized image processor of claim 2 wherein the upscaler further comprises:
a Single-Frame (SF) image processor that has a single input frame as an input to generate SF pixel values;
a Multi-Frame (MF) image processor that has multiple input frames as inputs to generate MF pixel values;
wherein the MF image processor generates more visual artifacts in a target frame than does the SF image processor when generating the target frame when using a same set of parameters;
a weight generator for generating a SF weight and a MF weight, wherein the measurement of anisotropy for the region contributes to the SF weight and to the MF weight; and
a pixel blender, receiving SF pixel values from the SF image processor and receiving MF pixels from the MF image processor, the pixel blender combining a SF pixel value scaled by the SF weight, and a MF pixel value scaled by the MF weight, to generate a pixel for the output frame;
wherein the SF pixel weight is larger than the MF pixel weight for pixels in the structured regions;
wherein the SF pixel weight is smaller than the MF pixel weight for pixels in the random-texture regions,
whereby SF and MF pixel weights are adjusted by the degree of anisotropy of the region.

5. The visual-experience optimized image processor of claim 2 further comprising:
a deblur filter that deblurs pixels in a frame in response to a deblur control input receiving a deblur control value, the deblur control input controlling a degree of deblur performed on the pixels by the deblur filter;
wherein the preference values from the HVPM map are at least a portion of the deblur control value applied to the deblur control input;
wherein pixels in the structured regions receive a lower degree of deblur than pixels in the random-texture regions when other inputs to the deblur control value are constant,
whereby structured regions are processed less sharply than random-texture regions.

6. The visual-experience optimized image processor of claim 5 further comprising:
a depth estimator that generates depth values for regions in the input frame, the depth values indicating an estimated depth from a viewer for pixels in the region;
wherein the depth values are a portion of the deblur control value applied to the deblur control input;
wherein pixels in regions having greater depth values receive a lower degree of deblur than pixels in regions having lower depth values when other inputs to the deblur control value are constant,
whereby low-depth regions are deblured more than high-depth regions.

7. The visual-experience optimized image processor of claim 2 further comprising an Iterative Back-Projection (IBP) corrector that comprises:
a smooth filter that smoothes pixels in the output frame in response to a smooth control input receiving a smooth control value to generate a smoothed intermediate frame, the smooth control input controlling a degree of smoothing performed on the pixels by the smooth filter;
wherein the preference values from the HVPM map are at least a portion of the smooth control value applied to the smooth control input;
wherein pixels in the structured regions receive a smaller degree of smoothing than pixels in the random-texture regions when other inputs to the smooth control value are constant;
a downsampler that converts the smoothed intermediate frame having the high resolution to a second intermediate frame having the low resolution;
a weighted pixel subtractor that generates residual pixels as a weighted differences between pixels in the second intermediate frame and corresponding pixels in the input frame;
an upsampler that converts the residual pixels to a high-resolution residual frame of upsampled residual pixels; and
a pixel adder that adds the upsampled residual pixels to pixels in the output frame to adjust pixels in the output frame,
whereby pixels in the output frame are adjusted by the IBP corrector that has smoothing controlled by the preference values from the HVPM map so that output pixels receive an overall effect of sharpening, and wherein output pixels in the structured regions receive a smaller degree of sharpening than output pixels in the random-texture regions when other inputs to the smooth control value are constant.

8. A method for generating Super Resolution (SR) images from Low Resolution (LR) images comprising:
building a Human Visual Preference Model (HVPM) map using a LR image, the HVPM map having a plurality of human preference values, each human preference value indicating when a pixel is in an immaculate region and when the pixel is in a random region;

wherein a visual artifact is highly visible to a human when in the immaculate region, but when the visual artifact is in the random region, the visual artifact is not noticeably visible;

wherein the human preference values indicate a degree of visibility to the human based on the HVPM;

partitioning the LR image into a plurality of overlapped patches of pixels;

searching the LR image or a downsampled LR image for a matching patch of pixels for each overlapped patch of pixels in the LR image;

blending a plurality of a HR counterpart of the matching patch of pixels found in the LR image to form a reconstructed SR image; and applying an Iterative Back-Projection (IBP) on the reconstructed SR image to create a SR image using the human preference values from the HVPM map to adjust pixels in the SR image, so that SR pixels in the immaculate region more closely match their corresponding pixels in the LR image while SR pixels in the random region less closely match their corresponding pixels in the LR image, whereby human preference values are generated and applied to adjust pixels.

9. The method of claim 8 further comprising:

generating reliability measurements that indicate a probability of generating visible artifacts in a patch of pixels during processing; and combining the reliability measurements with the human preference values to generate blending weights that control blending to form the reconstructed SR image.

10. The method of claim 8 further comprising:

generating a depth map having depth estimates that indicate an estimated 3D depth within the LR image; and selectively smoothing and deblurring the SR image using the depth map and the HVPM map to improve a depth sense of the SR image.

11. The method of claim 8 wherein building the HVPM map comprises:

generating a first value for the LR image using a Just Noticeable Distortion (JND) model that combines luminance adaptation and local contrast of a region in the LR image;

generating a regularity measurement for each patch of pixels of the LR image by using a structure tensor to detect structured regions, a corner detector to detect corners, and a flatness detector to detect regions of low local variance; and generating the human preference value for each patch of pixels of the LR image by combining the first value from the JND model with the regularity measurement.

12. The method of claim 8 wherein applying the Iterative Back-Projection (IBP) on the reconstructed SR image to create the SR image comprises:

(a) smoothing the reconstructed SR image using a smooth filter that is tuned by the human preference value from the HVPM map to generate a smoothed image;

downsampling the smoothed image to a same size as the LR image to generate a smoothed LR image;

subtracting to obtain a difference of the LR image and the smoothed LR image to obtain a residual image;

rectifying the residual image by multiplying each pixel by a residual weight to generate a rectified residual image;

up-sampling the rectified residual image to generate an up-sampled residual image;

adding the up-sampled residual image to the reconstructed SR image; and repeating from step (a) for a pre-defined number of times to generate a SR image.

13. The method of claim 12 wherein the residual weight is generated by:

generating a first sharpness measurement of a pixel in the LR image and a second sharpness measurement of a corresponding pixel in the smoothed LR image;

generating a first weight as a difference between the first sharpness measurement and the second sharpness measurement;

generating a second weight as the second sharpness measurement; and combining the first weight and the second weight to generate the residual weight.

14. The method of claim 9 wherein blending the plurality of the matching patch of pixels found in the LR image to form the reconstructed SR image comprises:

generating a Multi-Frame (MF) patch weight for the matching patch of pixels found in a previous LR image and in a later LR image;

weighted summing the matching patch of pixels found in the previous LR image and in the later LR image using the MF patch weight to create a MF reconstructed image;

generating a Single-Frame (SF) patch weight for the matching patch of pixels found in a current LR image that is between the previous LR image and the later LR image in a sequence of LR images;

weighted summing the matching patch of pixels found in the current LR image using the SF patch weight to create a SF reconstructed image; and pixel-to-pixel weighted summing the MF reconstructed image and the SF reconstructed image using weights determined by sharpness measurements of corresponding pixels in the SF reconstructed image and in the MF reconstructed image.

15. The method of claim 14 wherein generating the SF patch weight comprise combining the human preference value, a patch similarity, and a pixel-to-pixel similarity for each pixel in the matching patch of pixels;

wherein generating the MF patch weight comprise combining the human preference value, a motion vector continuity measurement, a motion vector length, and a patch similarity for each pixel in the matching patch of pixels.

16. An image optimizing system comprising:

an input frame of pixels;

a patch selector that selects a selected patch of pixels in the input frame of pixels;

a gradient generator, receiving the selected patch of pixels, for generating a gradient for the selected patch of pixels;

a tensor generator that receives the gradient and generates a tensor matrix that indicates structure within the selected patch of pixels;

an eigenvalue generator that solves the tensor matrix to determine a first eigenvalue and a second eigenvalue;

a regularity measurement generator that receives the first eigenvalue and the second eigenvalue and generates a regularity measurement that indicates a degree or regularity of pixels within the selected patch of pixels;

a local variance generator, receiving the selected patch of pixels, for generating a local variance value;

a flatness detector, receiving the gradient from the gradient generator, that generates a flatness indicator that indicates that the selected patch of pixels has low gradients;

a luminance adaptor that receives the selected patch of pixels and generates a background luminance value for the selected patch of pixels;

a preference generator that generates a preference value for the selected patch of pixels by combining the regularity measurement, the local variance value, the flatness indicator, and the background luminance value;

wherein the preference value indicates a preference for image details for the selected patch of pixels using a Human-Visual-System (HVS) model wherein artifacts are permissible in regions having randomness and texture, and artifacts are not preferred in regions having regular structures, or are relatively flat; and an image filter that filters pixels in a pre-filtered frame of pixels using a filtering function that has a strength determined at least in part by the preference value for the selected patch of pixels when pixel locations that correspond to the selected patch of pixels are being filtered, the image filter generating a filtered frame of pixels;

wherein the patch selector successively selects different patches of pixels in the input frame of pixels to cover the input frame of pixels and the preference generator successively generates preference values for all patches of pixels in the input frame to generate a preference map.

17. The image optimizing system of claim 16 wherein the input frame of pixels is an input Low-Resolution (LR) frame of pixels having a low resolution;

further comprising:

an output for a High-Resolution (HR) frame of pixels having a high resolution that is at least double the low resolution; and an initial upscaler that receives the input LR frame of pixels and generates an initial HR frame that has at least four times more pixels than the input LR frame of pixels.

18. The image optimizing system of claim 17 further comprising:

a frame buffer that stores a plurality of the initial HR frame that are in a sequence of frames;

a Single Frame (SF) patch searcher that selects a current SF patch of pixels in the initial HR frame for processing;

a Multi-Frame (MF) patch searcher that searches for matching patches of pixels in the plurality of initial HR frames in the frame buffer for the current SF patch of pixels;

a multi-frame patch blender that blends the matching patches of pixels to generate a current MF patch of pixels;

a SF/MF pixel weighter that generates a SF weight and a MF weight using the preference value for the current SF patch of pixels, and a SF/MF pixel blender that generates a blended pixel for all pixels in the current SF patch of pixels by adding pixels in the current SF patch of pixels that are weighted by the SF weight to the current MF patch of pixels that are weighted by the MF weight, whereby SF and MF pixels are weighted by the preference values.

19. The image optimizing system of claim 18 wherein the image filter comprises an Iterative Back-Projection (IBP) filter that comprises:

a smoothing filter that receives the blended pixels from the SF/MF pixel blender, and performs a smoothing function on the blended pixels to generate a HR filtered frame;

wherein the preference value controls at least a portion of a strength of the smoothing function when the smoothing filter is filtering pixel locations that correspond to a patch of pixels having the preference value;

a downsampler that converts the HR filtered frame having the high resolution to a smoothed intermediate frame having the low resolution;

a weighted pixel subtractor that generates residual pixels as a weighted difference between pixels in the smoothed intermediate frame and corresponding pixels in the input LR frame;

an upsampler that converts the residual pixels to a residual frame of upsampled residual pixels; and a pixel adder that adds upsampled residual pixels in the residual frame of upsampled residual pixels to the blended pixels to generate reconstructed pixels in a reconstructed HR frame of pixels.

20. The image optimizing system of claim 19 further comprising:

a depth estimator that generates depth values for pixels, the depth values indicating an estimated three-dimensional depth within a frame;

a depth smoothing filter that performs a depth smoothing operation on pixels having deeper depth values to generate a depth-adjusted frame of pixels; and a depth sharpening filter, receiving the preference values, that performs a depth sharpening operation on pixels having shallower depth values and that having preference values that indicate the preference for image details to generate the depth-adjusted frame of pixels.

* * * * *